United States Patent
Gulick, Jr.

(10) Patent No.: US 9,298,219 B2
(45) Date of Patent: Mar. 29, 2016

(54) SECURITY DEVICE FOR FUNCTIONAL DISPLAY, SECURITY, AND CHARGING OF HANDHELD ELECTRONIC DEVICES

(71) Applicant: Scorpion Security Products, Inc., Binghamton, NY (US)

(72) Inventor: Franklyn W. Gulick, Jr., Binghamton, NY (US)

(73) Assignee: Scorpion Security Products, Inc., Binghamton, NY (US)

( * ) Notice: Subject to any disclaimer, the term of this patent is extended or adjusted under 35 U.S.C. 154(b) by 0 days.

(21) Appl. No.: 14/399,792

(22) PCT Filed: May 9, 2013

(86) PCT No.: PCT/US2013/040397
§ 371 (c)(1),
(2) Date: Nov. 7, 2014

(87) PCT Pub. No.: WO2014/062236
PCT Pub. Date: Apr. 24, 2014

(65) Prior Publication Data
US 2015/0089675 A1    Mar. 26, 2015

Related U.S. Application Data

(60) Provisional application No. 61/644,483, filed on May 9, 2012.

(51) Int. Cl.
F16M 13/00 (2006.01)
G06F 1/16 (2006.01)

(52) U.S. Cl.
CPC .................................. *G06F 1/1632* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,555,302 A * | 9/1996 | Wang | ................... | B60R 11/0241 379/426 |
| 5,825,874 A * | 10/1998 | Humphreys | ........ | B60R 11/0241 379/446 |
| 5,903,645 A * | 5/1999 | Tsay | ................... | B60R 11/0241 248/316.4 |
| 6,762,585 B2 * | 7/2004 | Liao | ..................... | H02J 7/0044 320/107 |
| 6,848,662 B2 * | 2/2005 | Paramonoff | ............. | E05C 3/14 248/222.11 |
| 8,241,050 B2 * | 8/2012 | Xu | ........................ | G06F 1/1632 439/247 |
| 8,985,544 B1 * | 3/2015 | Gulick, Jr. | ............. | F16M 13/00 248/176.1 |
| 2004/0141287 A1 | 7/2004 | Kim et al. | | |
| 2008/0156836 A1 | 7/2008 | Wadsworth et al. | | |
| 2009/0079566 A1 * | 3/2009 | Goldstein | .......... | G08B 13/1463 340/568.1 |
| 2009/0173863 A1 * | 7/2009 | Crown | ................ | B60R 11/0241 248/316.4 |
| 2010/0039715 A1 | 2/2010 | Xu et al. | | |
| 2010/0194568 A1 * | 8/2010 | Irmscher | ................. | A47F 3/002 340/568.3 |
| 2010/0197354 A1 | 8/2010 | Lee et al. | | |
| 2010/0264182 A1 | 10/2010 | Perlman et al. | | |
| 2012/0057293 A1 * | 3/2012 | Detemple | ............. | G06F 1/1632 361/679.41 |

OTHER PUBLICATIONS

International Search Report & Written Opinion, Application No. PCT/US2013/040397, Applicant, Scorpion Security Products, Inc. Mailed May 16, 2014, 10 pages.

* cited by examiner

*Primary Examiner* — Monica Millner
(74) *Attorney, Agent, or Firm* — Barclay Damon, LLP

(57) ABSTRACT

A security device for allowing functional display and charging of handheld electronic devices is disclosed. The security device includes clamps with channels configured to press against and grip the edges of the handheld electronic device. In some embodiments, the security device includes a charging/data connector onto which the charging/data port of the handheld security device can be mounted.

15 Claims, 18 Drawing Sheets

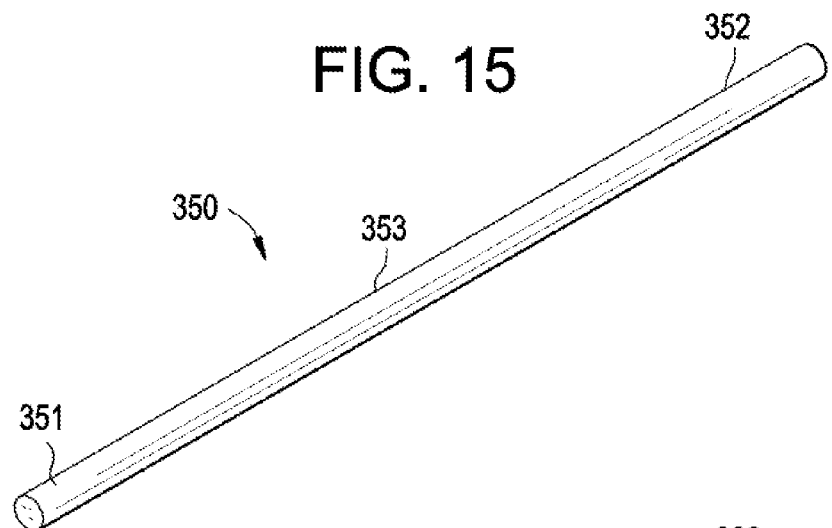
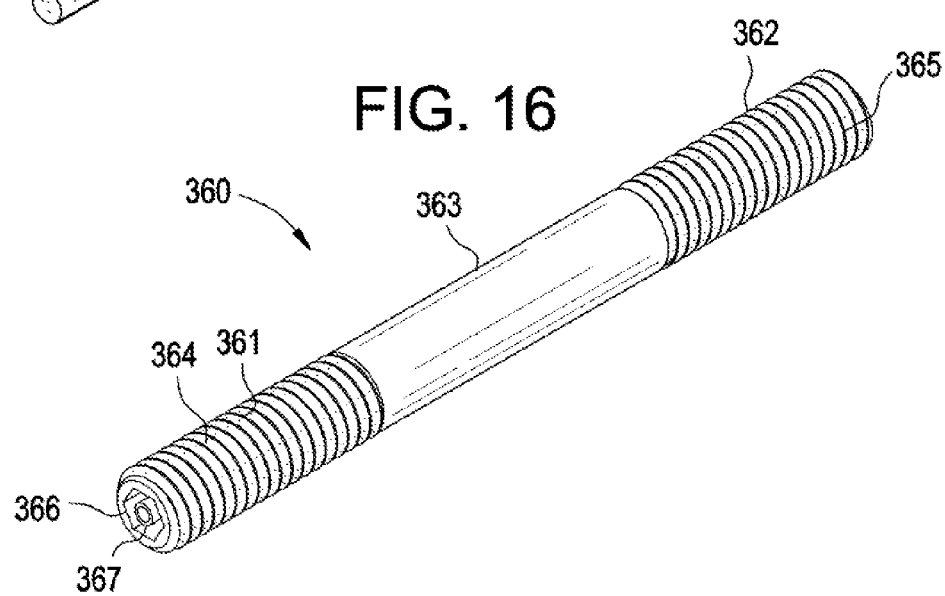
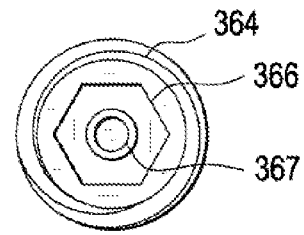

FIG. 33
FIG. 34
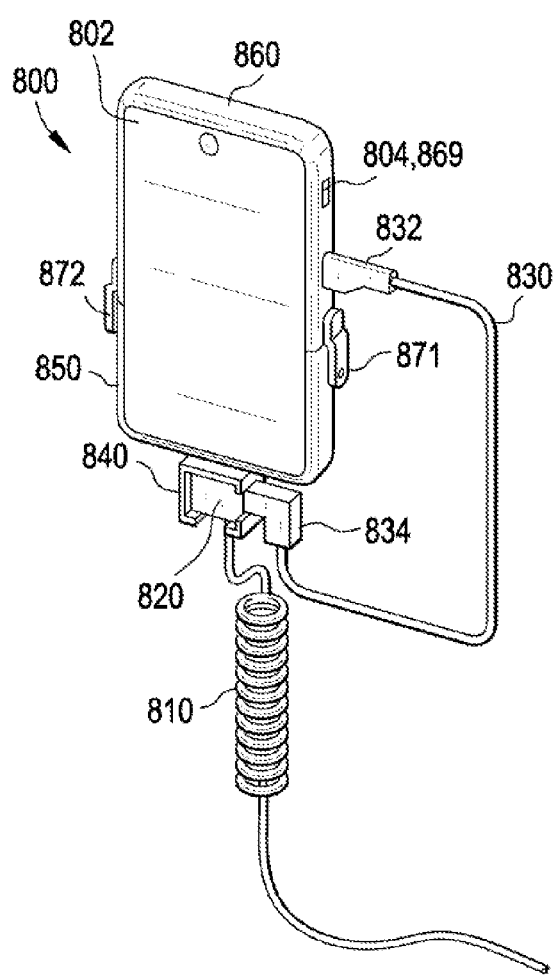
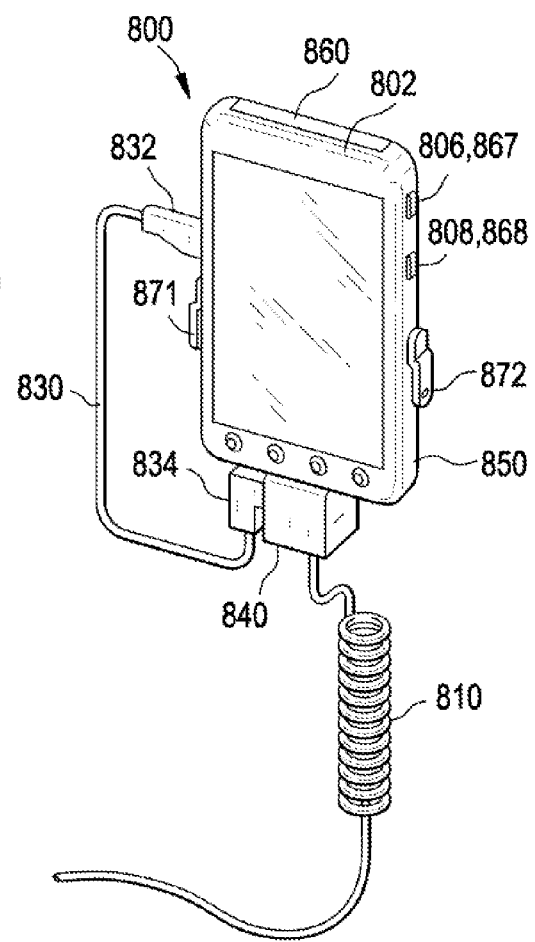

SECURITY DEVICE FOR FUNCTIONAL DISPLAY, SECURITY, AND CHARGING OF HANDHELD ELECTRONIC DEVICES

CROSS-REFERENCE TO RELATED APPLICATIONS

This application claims priority from, and is a national stage application pursuant to 35 U.S.C. §371 of, PCT Application No. PCT/US2013/040397, filed May 9, 2013, and entitled Security Device For Functional Display, Security, And Charging Of Handheld Electronic Devices, the entire contents of which is herein incorporated by reference. PCT Application No. PCT/US2013/040397 claims priority from U.S. Provisional Patent Application Ser. No. 61/644,483, filed May 9, 2012, the entire contents of which is herein incorporated by reference.

FIELD OF THE INVENTION

The invention relates to a security device for allowing functional display and charging of handheld electronic devices.

BACKGROUND OF THE INVENTION

Retailers sell handheld electronic devices to the public in a range of shapes and sizes, with a range of functionality. Encouraging customers to pick up, hold, examine, and use the functionality of the devices at display locations is a valuable marketing technique employed by retailers. To decrease the risk of theft associated with this marketing strategy, retailers employ various security measures.

One common security measure is the use of an alarm switch that sets (e.g., closes) when placed in contact with the surface of the handheld electronic device and activates (e.g., opens) when it loses contact with the device (e.g., when the alarm switch is removed). A typical alarm switch is attached to one portion of the handheld electronic device using an adhesive tape or similar adhesive product. During use, the adhesives often fail, resulting in the alarm switch losing contact with the handheld electronic device and causing alarms to sound and startle innocent customers, negatively affecting their shopping experience. When these false alarms occur at a high frequency, retailers tend to ignore the alarms or even turn them off to avoid disrupting customer shopping experiences, leaving retailers vulnerable to theft. Furthermore, these alarm switches are only activated when the alarm switch loses contact with the portion of the handheld electronic devices to which it has been attached. For example, if the alarm switch is attached to the battery cover of a wireless phone, a thief can remove and steal the remainder of the wireless phone (i.e., all components but the battery cover) without activating the alarm switch. In order to combat this, retailers often install a plurality of alarm switches in multiple locations on the handheld electronic devices (e.g., front and back, inside the battery compartment, etc.). These alarm switches often hinder customer inspection of the device. In some cases, these alarm switches installed within the handheld electronic devices can ignite when subjected to excessive heat within the devices.

In addition to preventing theft of handheld electronic devices, in order to ensure that the devices on display are functional, retailers need to provide charging of the devices on a regular basis so that customers can operate the devices. In many instances, this charging requirement is provided by a separate charging device that can also hinder access to the handheld electronic device and present a visually unappealing display. Existing security solutions also are generally located on the back of the handheld electronic devices, hindering or prohibiting access and viewing of features on the back of these devices, as well as the ability for a customer to feel the back of the devices in his or her hand.

The discussion above is merely provided for general background information and is not intended to be used as an aid in determining the scope of the claimed subject matter.

BRIEF DESCRIPTION OF THE INVENTION

A security device for allowing functional display and charging of handheld electronic devices is disclosed. The security device includes clamps with channels configured to press against and grip the edges of the handheld electronic device. In some embodiments, the security device includes a charging/data electrical connector onto which the charging/data port of the handheld security device can be mounted. An advantage that may be realized in the practice of some disclosed embodiments of the security device is that a customer can view and/or operate features and controls of the handheld electronic device without obstruction by the security device. In addition, the handheld electronic device can be charged without a separate charging cable.

In one embodiment, a security device for functional display of a handheld electronic device is disclosed wherein the handheld electronic device has a first edge, a second edge, and a third edge extending between the first edge and the second edge, and wherein the handheld electronic device has first corner between the first edge and the third edge and a second corner between the second edge and the third edge. The security device comprises an axle having a first end, a second end, and a center section extending between the first end of the axle the second end of the axle, wherein the first end of the axle is threaded with a first thread pattern and the second end of the axle is threaded with a second thread pattern, and wherein the first thread pattern is counter rotational to the second thread pattern, a body assembly configured for contacting the third edge of the handheld electronic device, the body assembly having a first hole extending transversely through the body assembly, wherein the center section of the axle extends through the first hole of the body assembly parallel to a longitudinal axis of the security device, a first clamp having a first base and a first retention leg extending from the first base, the first clamp having a first hole extending transversely through the first base of the first clamp parallel to the longitudinal axis of the security device, wherein the first hole of the first base of the first clamp is threaded with the first thread pattern, wherein the first end of the axle is threaded into the first hole of the first base of the first clamp, and wherein the first clamp further comprises a first channel formed on the inner surface of the first retention leg and the first base configured to grip the first corner along the first edge and the third edge of the handheld electronic device, and a second clamp having a second base and a second retention leg extending from the second base, the second clamp having a first hole extending transversely through the second base of the second clamp parallel to the longitudinal axis of the security device, wherein the first hole of the second base of the second clamp is threaded with the second thread pattern, and wherein the second end of the axle threaded into the second hole of the second base of the second clamp, wherein the second clamp further comprises a second channel formed on the inner surface of the second retention leg and the second base configured to grip the second corner along the second edge and the third edge of the handheld electronic device, wherein the axle is configured to move the first clamp axially toward the body assembly and the second clamp axially toward the body assembly to secure the handheld electronic device when the axle is rotated in a first direction.

In another embodiment, the security device comprises an axle having a first end, a second end, and a center section extending between the first end of the axle the second end of the axle, wherein the first end of the axle is threaded with a first thread pattern and the second end of the axle is threaded with a second thread pattern, and wherein the first thread pattern is counter rotational to the second thread pattern, a body assembly configured for contacting the third edge of the handheld electronic device, the body assembly having a first hole extending transversely through the body assembly, wherein the center section of the axle extends through the first hole of the body assembly parallel to a longitudinal axis of the security device, the body assembly further comprising an electrical connector extending from the body assembly configured to be directly inserted into a port on the third edge of the handheld electronic device, a first clamp having a first base and a first retention leg extending from the first base, the first clamp having a first hole extending transversely through the first base of the first clamp parallel to the longitudinal axis of the security device, wherein the first hole of the first base of the first clamp is threaded with the first thread pattern, wherein the first end of the axle is threaded into the first hole of the first base of the first clamp, and wherein the first clamp further comprises a first channel formed on the inner surface of the first retention leg and the first base configured to grip the first corner along the first edge and the third edge of the handheld electronic device, a first spacer located between the first clamp and the body assembly, the first spacer having a first hole extending transversely through the first spacer, wherein the axle extends through the first hole of the first spacer parallel to the longitudinal axis of the security device, a second clamp having a second base and a second retention leg extending from the second base, the second clamp having a first hole extending transversely through the second base of the second clamp parallel to the longitudinal axis of the security device, wherein the first hole of the second base of the second clamp is threaded with the second thread pattern, and wherein the second end of the axle threaded into the second hole of the second base of the second clamp, wherein the second clamp further comprises a second channel formed on the inner surface of the second retention leg and the second base configured to grip the second corner along the second edge and the third edge of the handheld electronic device, a second spacer located between the second clamp and the body assembly, the second spacer having a first hole extending transversely through the second spacer, wherein the axle extends through the first hole of the second spacer parallel to the longitudinal axis of the security device, wherein the axle is configured to move the first clamp axially toward the body assembly and the second clamp axially toward the body assembly to secure the handheld electronic device when the axle is rotated in a first direction.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 15 is a perspective view of an exemplary guide pin of the first exemplary security device shown in FIGS. 5-11;

FIG. 16 is a perspective view of an exemplary axle of the first exemplary security device shown in FIGS. 5-11;

FIG. 17 is a perspective view of an exemplary hexagonal key hole of the first exemplary security device shown in FIGS. 5-11;

FIG. 33 is a perspective rear view of the sixth exemplary security device for securing a handheld electronic device; and FIG. 34 is a perspective front view of the sixth exemplary security device for securing a handheld electronic device.

DETAILED DESCRIPTION OF THE INVENTION

The security devices disclosed herein can be used for a variety of handheld electronic devices, such as smartphones, wireless phones, personal digital assistants (PDAs), radios, scanners, pagers, GPS systems, multimeters, cameras, music players, power tools, calculators, handheld computers such as electronic tablets, netbooks, notebooks, laptops, and electronic readers, and other similar handheld electronic devices.

Figure 1:
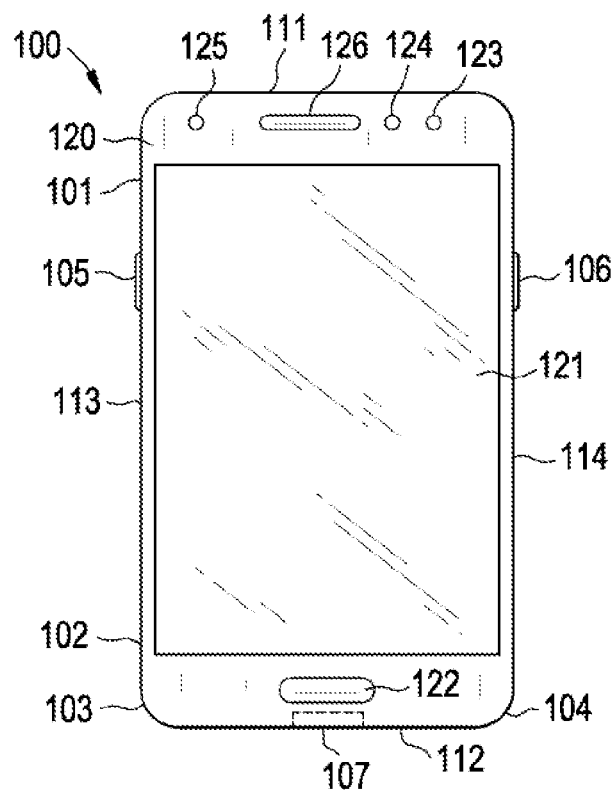
FIG. 1 is a front view of an exemplary smartphone.
Figure 2:
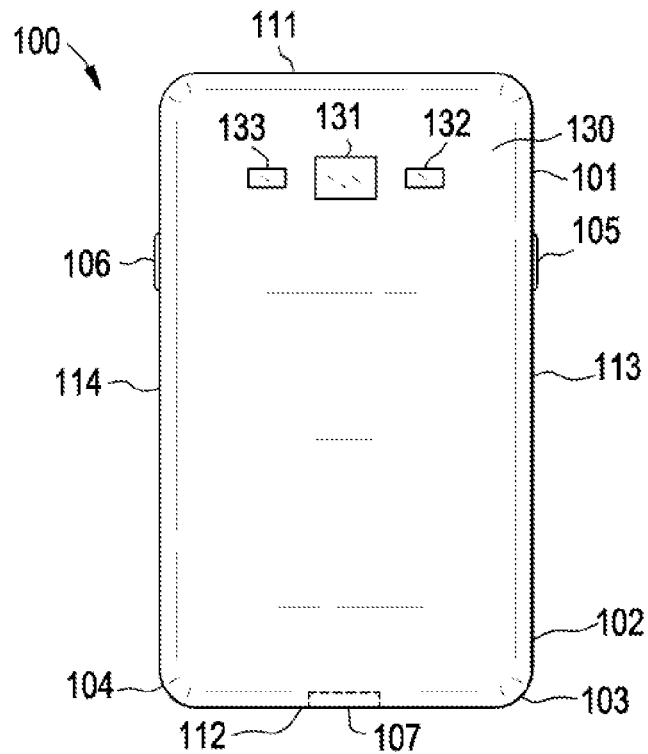
FIG. 2 is a rear view of the exemplary smartphone of FIG. 1.

FIGS. 1 and 2 are front and rear views of an exemplary smartphone 100 that can be secured by the exemplary security devices disclosed herein. The smartphone 100 has a top end 101 and a bottom end 102. The smartphone 100 has a top edge 111, a bottom edge 112, a left edge 113, and a right edge 114. The smartphone 100 has a bottom-left corner 103 between the left edge 113 and the bottom edge 112 and a bottom-right corner 104 between the right edge 114 and the bottom edge 112. In one embodiment, the charging/data port 107 of the smartphone 100 is located on the bottom edge 112 of the smartphone 100 and is configured to receive a Micro Universal Serial Bus (USB) electrical connector.

Exemplary features of the smartphone 100 include a volume control 105 located on the left edge 113 of the smartphone 100 and a power control 106 located on the right edge 114 of the smartphone 100. The front side 120 of the smartphone 100 includes a display screen 121, a control button 122 located on the bottom end 102 of the smartphone 100, and a front side camera lens 123, light sensor 124, LED indicator 125, and earpiece 126 located on the top end 101 of the smartphone 100. The back side 130 of the smartphone 100 includes a back side camera lens 131, a camera flash 132, and a speaker 133. It is desirable to provide a security device for this smartphone 100 that allows a customer to view and/or operate these features and controls without obstruction by the security device.

Figure 3:
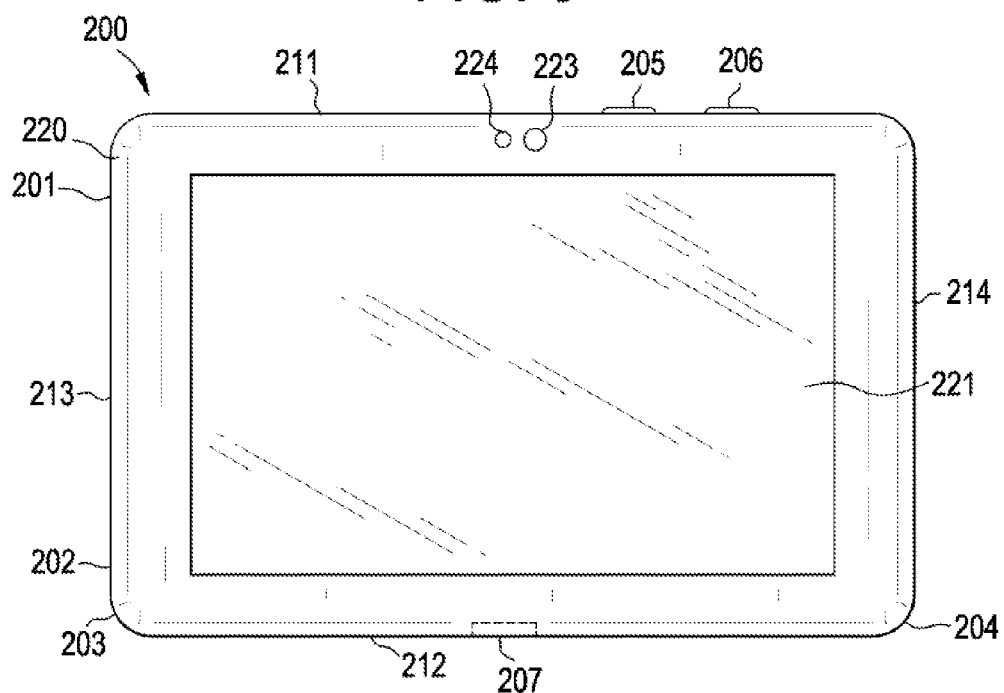
FIG. 3 is a front view of an exemplary electronic tablet.
Figure 4:
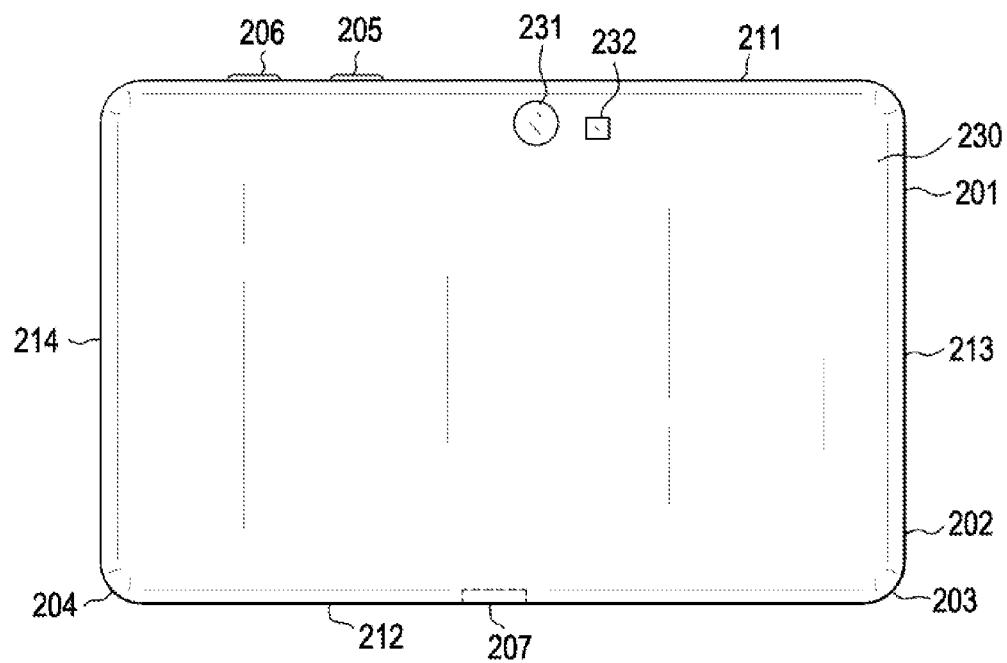
FIG. 4 is a rear view of the exemplary electronic tablet of FIG. 3.
Figure 5:
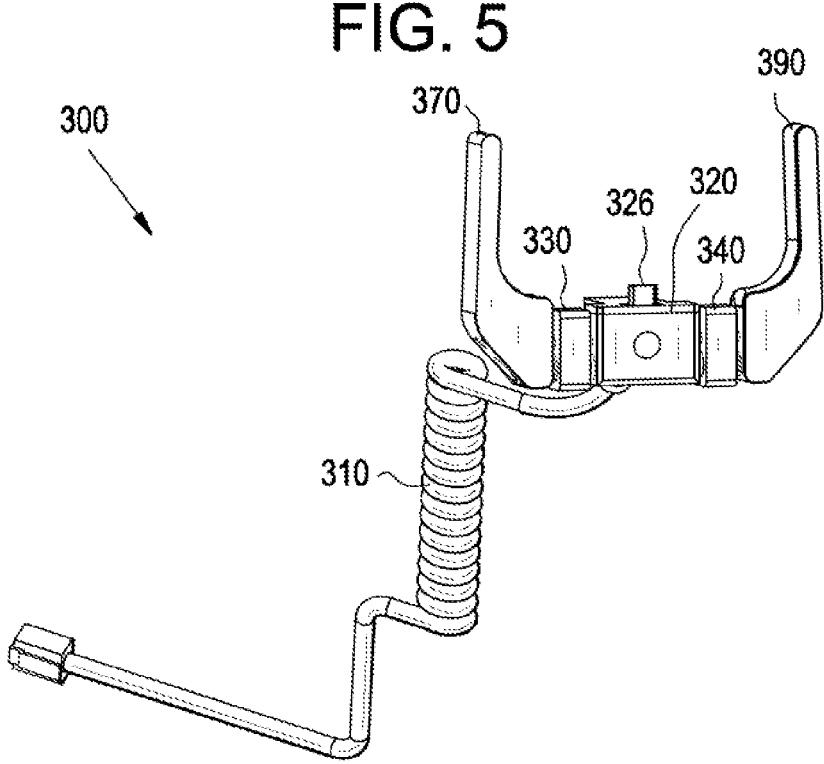
FIG. 5 is a perspective front view of a first exemplary security device for securing a handheld electronic device.
Figure 6:
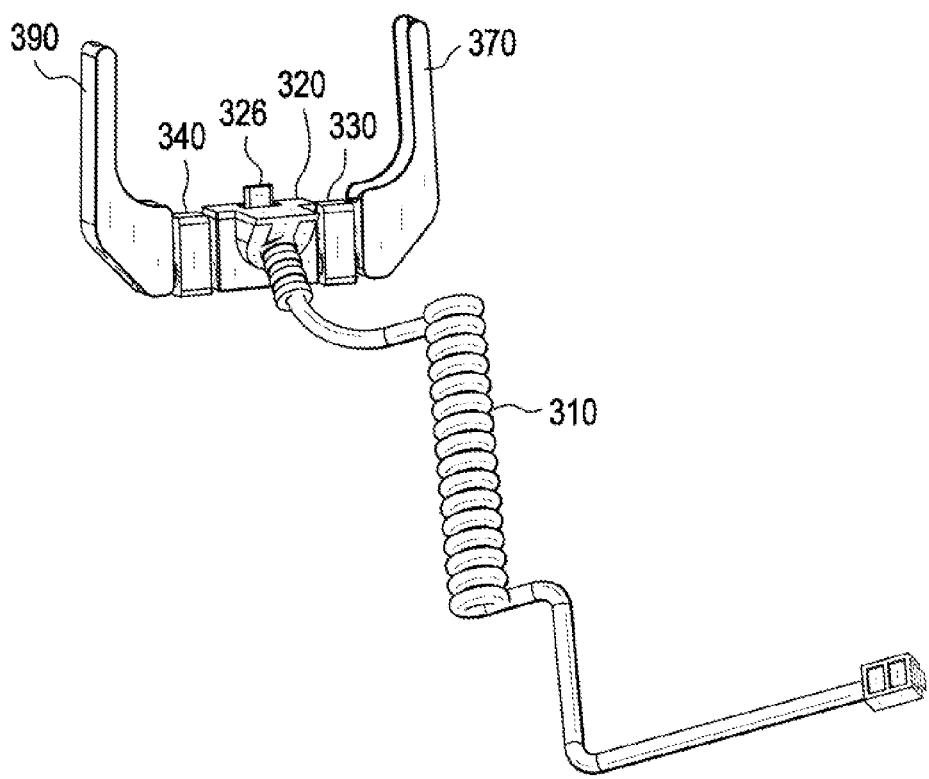
FIG. 6 is a perspective rear view of the first exemplary security device for securing a handheld electronic device.
Figure 7:
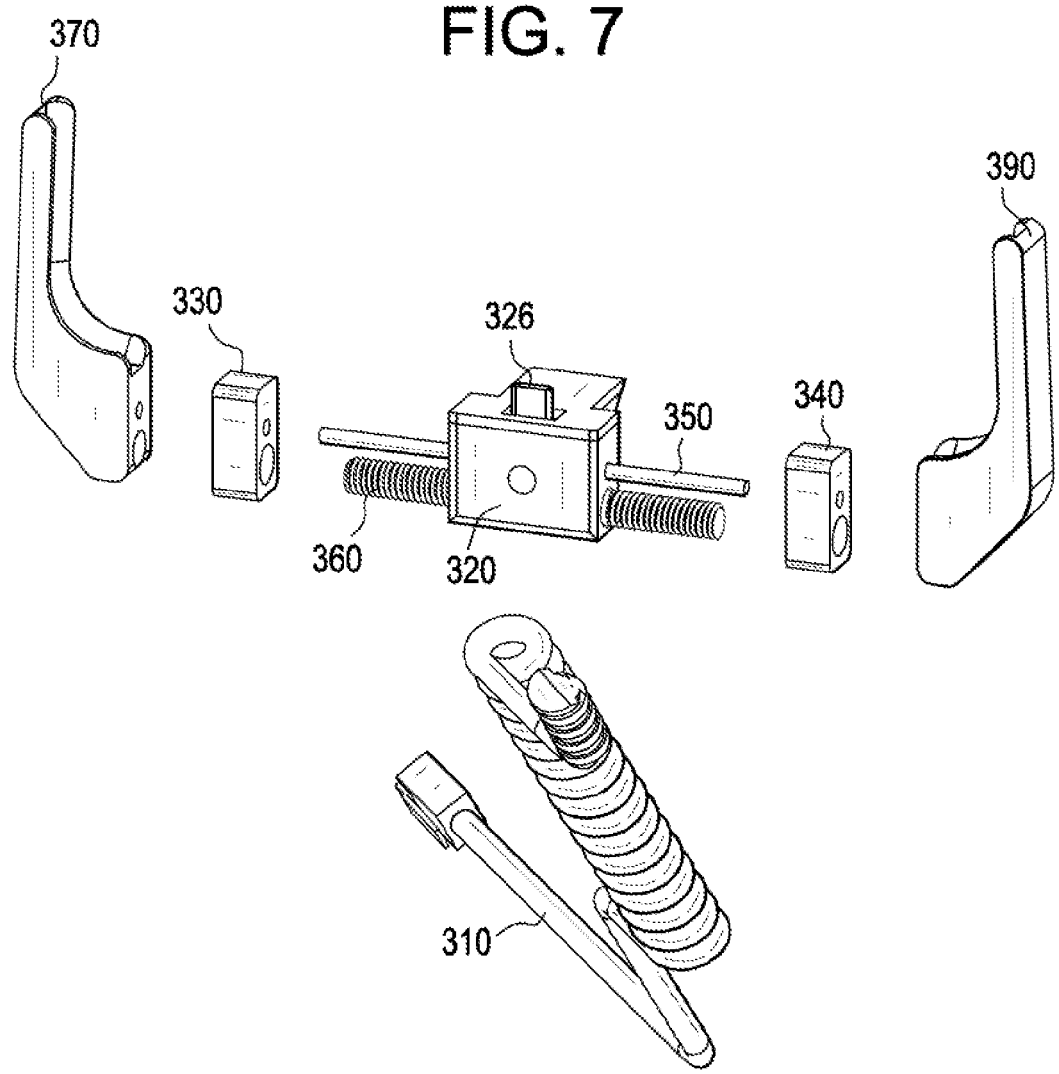
FIG. 7 is an exploded front view of the first exemplary security device for securing a handheld electronic device.
Figure 8:
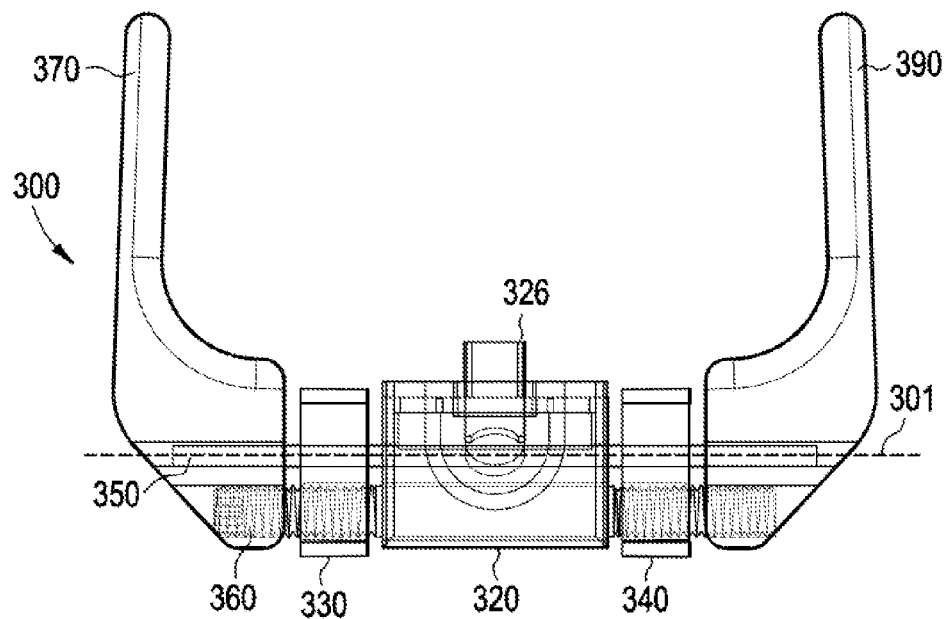
FIG. 8 is a cross-sectional front view of the first exemplary security device for securing a handheld electronic device.
Figure 9:
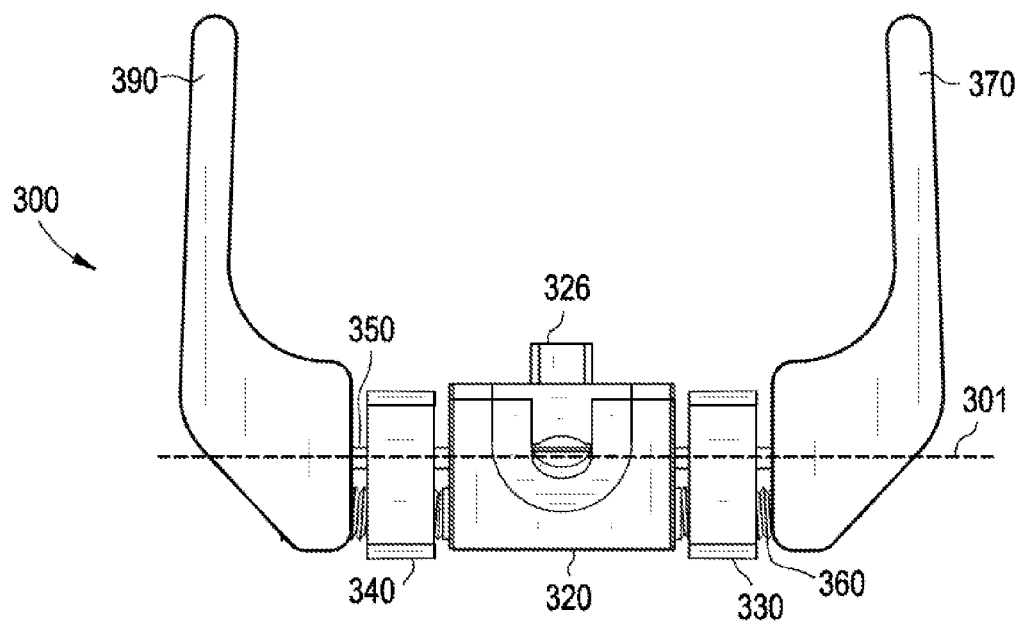
FIG. 9 is a rear view of the first exemplary security device for securing a handheld electronic device.
Figure 10:
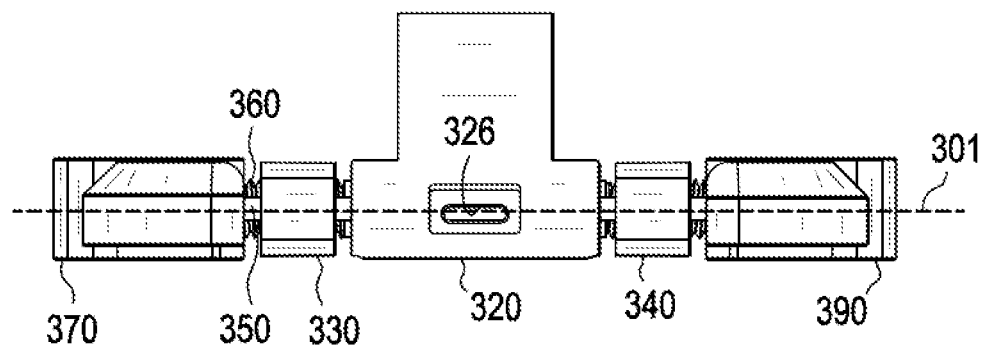
FIG. 10 is a top view of the first exemplary security device for securing a handheld electronic device.
Figure 11:
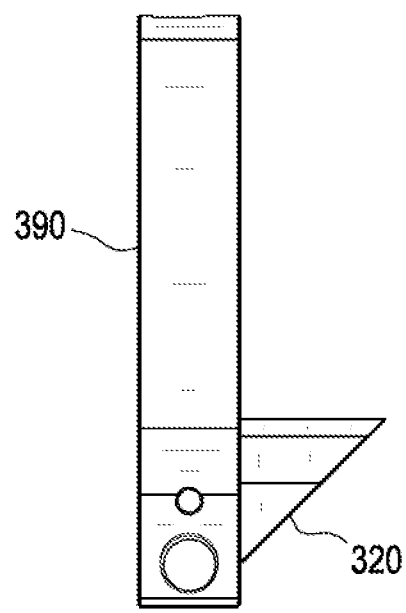
FIG. 11 is a side view of the first exemplary security device for securing a handheld electronic device.

FIGS. 3 and 4 are front and rear views of an exemplary electronic tablet 200 that can be secured by the exemplary security devices disclosed herein. The electronic tablet 200 has a top end 201 and a bottom end 202. The electronic tablet 200 has a top edge 211, a bottom edge 212, a left edge 213, and a right edge 214. The electronic tablet 200 has a bottom-left corner 203 between the left edge 213 and the bottom edge 212 and a bottom-right corner 204 between the right edge 214 and the bottom edge 212. In one embodiment, the charging/data port 207 of the electronic tablet 200 is located on the bottom edge 212 of the electronic tablet 200 and is configured to receive a 30-pin electrical connector.

Exemplary features of the electronic tablet 200 include a volume control 205 and power control 206 located on the top edge 211 of the electronic tablet 200. The front side 220 of the electronic tablet 200 includes a display screen 221, and a front side camera lens 223 and light sensor 224 located on the top end 201 of the electronic tablet 200. The back side 230 of the electronic tablet 200 includes a back side camera lens 231 and a camera flash 232. It is desirable to provide a security device for this electronic tablet 200 that allows a customer to view and/or operate these features and controls without obstruction by the security device.

FIGS. 5-11 are perspective, exploded, cross-sectional, front, rear, top, and side views of a first exemplary security device 300 for securing a handheld electronic device, such as the smartphone 100 shown in FIGS. 1 and 2 or similar device. In one embodiment, the security device 300 includes a cord assembly 310 for connecting a security system main terminal (not shown) to a body assembly 320. The body assembly is configured for contacting the bottom edge 112 of the smartphone 100. A left spacer 330 is located between the body assembly 320 and a left clamp 370, while a right spacer 340 is located between the body assembly 320 and the right clamp 390. A guide pin 350 and an axle 360 extend from the left clamp 370, through the left spacer 330, body assembly 320, and right spacer 340 to the right clamp 390, with all of the components aligned along a common longitudinal (horizontal) axis 301 of the security device 300.

As will be explained, a handheld electronic device (e.g., the smartphone 100 (FIGS. 1-2)) is connected to the security device 300 by directly inserting the charging/data electrical connector 326 (shown as a Micro USB electrical connector) of the body assembly 320 into the charging/data port 107 (FIGS. 1-2) of the smartphone 100. The left clamp 370 and the right clamp 390 are moved axially toward each other so that a gripping channel 377 formed on the inner surface of the left clamp 370 (FIGS. 20-22) presses against and grips the bottom-left corner 103 along the left edge 113 and the bottom edge 112 of the smartphone 100, while a gripping channel 397 formed on the inner surface of the right clamp 390 (FIG. 20) presses against and grips the bottom-right corner 104 along the right edge 114 and the bottom edge 112 of the smartphone 100. Given the configuration of the security device 300, the smartphone 100 can be charged without a separate charging cable and can be secured with minimal or no obstruction of the front side 120, back side 130, left edge 113, right edge 114, and top edge 111 of the smartphone 100.

Figure 12:
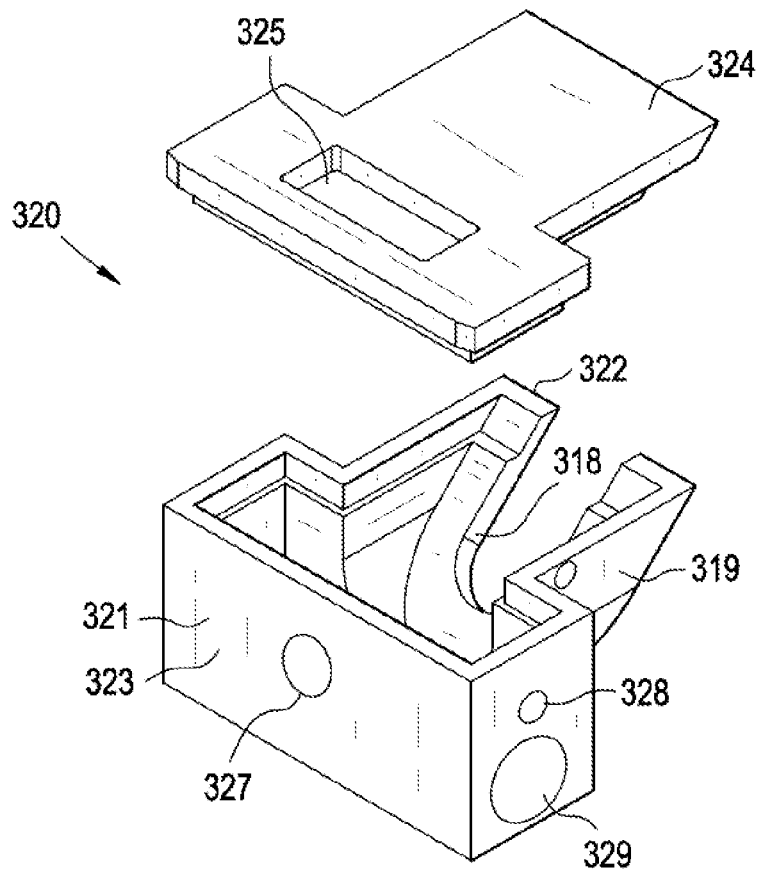
FIG. 12 is an exploded view of a first exemplary body assembly of the first exemplary security device shown in FIGS. 5-11 for housing a Micro USB electrical connector.

FIG. 12 is an exploded view of a first exemplary body assembly 320 of the first exemplary security device 300 shown in FIGS. 5-11 for housing a Micro USB charging/data electrical connector 326. The body assembly 320 includes a front end 321 and a back end 322. A housing 323 is located at the front end 321 of the body assembly and houses the charging/data electrical connector 326 (FIGS. 5-11) and associated elements (e.g., circuit board, wiring, etc.). A cord assembly receptacle 319, which includes a cord assembly receptacle slot 318, can receive the cord assembly 310 (FIGS. 5-7, 15), which includes the wiring to connect the body assembly 320 to a main terminal (not shown) of the security system. A cover 324 can be electromagnetically welded to and enclose the top portion of the housing 323 and the top portion of the cord assembly receptacle 319. The cover 324 includes an opening 325 sized to permit the charging/data electrical connector 326 to extend up from the housing 323 through the cover 324. An indicator light 327 (e.g., a light emitting diode (LED)) is located on the front surface of the housing 323 to provide a status indication of the security device 300 (e.g., blue light means a secure condition and red light means an alarm condition). In some embodiments (e.g., where the charging/data port of the smartphone is not located on the bottom edge 112 of the smartphone 100), the smartphone can be connected to the security device 300 by simply placing the bottom edge 112 of the smartphone 100 on the cover 324 of the body assembly 320 without a charging/data connection.

A guide pin hole 328 extends transversely through the body assembly 320, allowing the guide pin 350 (FIGS. 5-11, 15) to extend through the body assembly 320. Similarly, an axle hole 329 extends transversely through the body assembly 320, allowing the axle 360 (FIGS. 5-11, 16) to extend through the body assembly 320. In one embodiment, the body assembly 320 can be designed to move along the guide pin 350 and axle 360 in order to align its charging/data electrical connector 326 with the charging/data port on the handheld electronic device.

Figure 13:
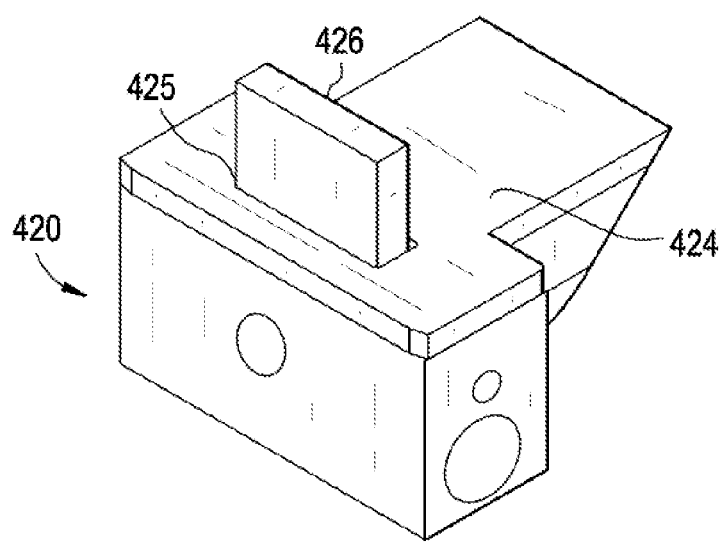
FIG. 13 is a perspective top view of a second exemplary body assembly of the second exemplary security device shown in FIG. 24 for housing a 30-pin electrical connector.
Figure 24:
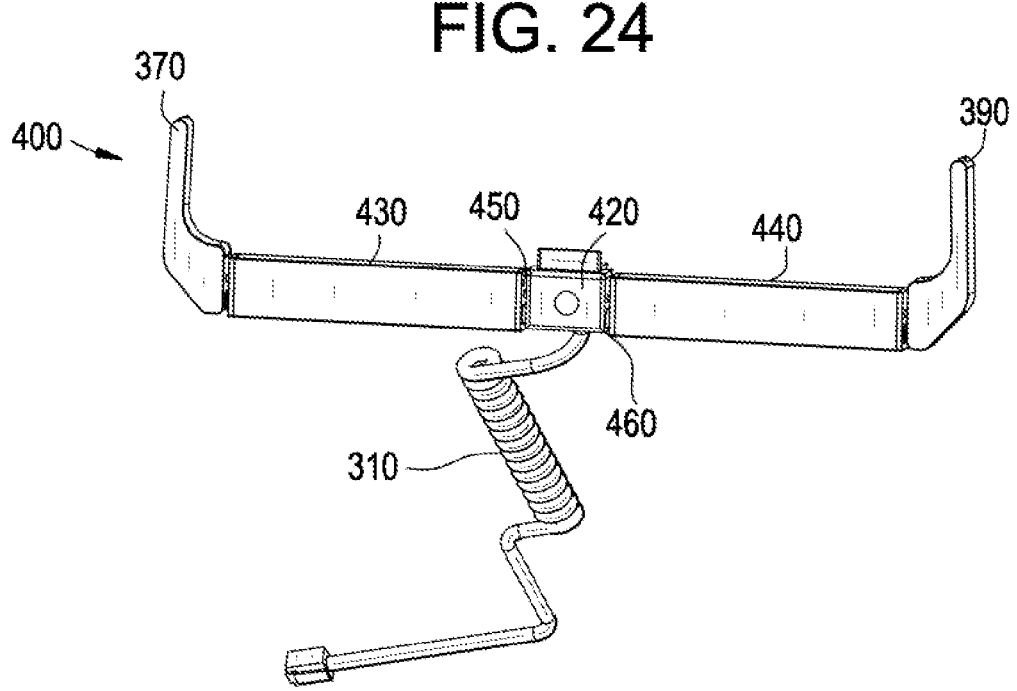
FIG. 24 is a perspective front view of a second exemplary security device for securing a handheld electronic device.

FIG. 13 is a perspective top view of a second exemplary body assembly 420 of the second exemplary security device 400 shown in FIG. 24 for housing a 30-pin charging/data electrical connector 426. The cover 424 of the body assembly 420 includes an opening 425 sized to permit the charging/data electrical connector 426 to extend up through the cover 424.

Figure 14:
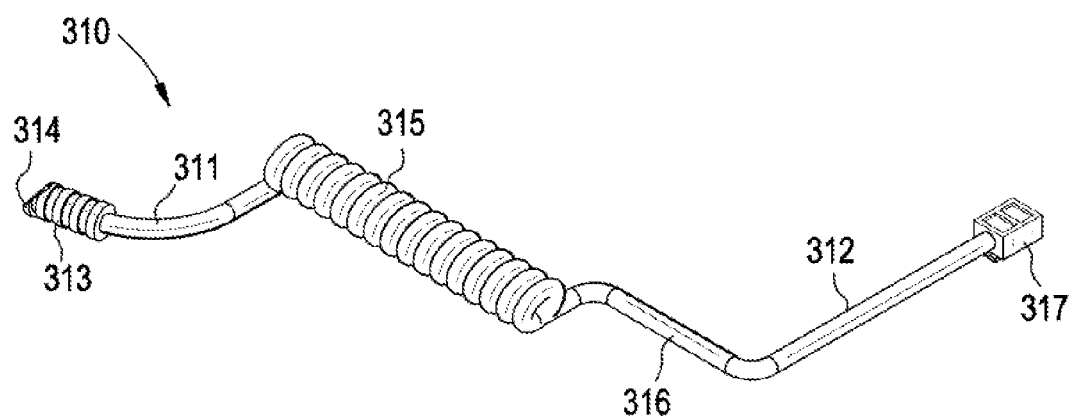
FIG. 14 is a perspective view of an exemplary cord assembly of the exemplary security devices shown in FIGS. 5-11, 24-27, and 31.

FIG. 14 is a perspective view of an exemplary cord assembly 310 of the first exemplary security device 300 shown in FIGS. 5-11. The cord assembly 310 has a first end 311 and a second end 312. A molded strain relief 313 is located at the first end 311 of the cord assembly 310. One or more grooves 314 on the molded strain relief 313 interlock with the cord assembly receptacle slot 318 (FIG. 12) when the first end 311 of the cord assembly 310 is received by the cord assembly receptacle 318 of the body assembly 320 (FIG. 12) to secure the cord assembly 310. The cord assembly 310 also includes a curled cord portion 315, allowing the cord assembly 310 to extend as desired by the customer. A straight cord portion 316 of the desired length allows the cord assembly 310 to extend to and connect to the security system main terminal (not shown) with a main terminal electrical connector 317 located on the second end 312 of the cord assembly 310. The wiring of the cord assembly 310 from the security system main terminal (not shown) to the body assembly 320 can be used to charge the smartphone 100 and to provide power to the LED 327. The security system main terminal (not shown) can be used to monitor whether the charging/data port 107 of the smartphone 100 remains connected to (secure condition), or is disconnected from (alarm condition), the charging/data electrical connector 326 of the body assembly 320.

FIG. 15 is a perspective view of an exemplary guide pin 350 of the first exemplary security device 300 shown in FIGS. 5-11. The guide pin 350 has a left end 351, right end 352, and a center section 353 between the left end 351 and the right end 352. As shown in FIGS. 5-11, the guide pin 350 extends parallel to the longitudinal axis 301 of the security device 300 from the left clamp 370, through the left spacer 330, body assembly 320, and right spacer 340 to the right clamp 390, with all of the components aligned along the guide pin 350. The guide pin 350 serves to stabilize and maintain the alignment of the left clamp 370, left spacer 330, body assembly 320, right spacer 340, and right clamp 390. While the exemplary embodiment uses a single guide pin 350, it will be understood that more than one guide pin 350 can be employed or, in some embodiments, no guide pin is required.

FIG. 16 is a perspective view of an exemplary axle 360 of the first exemplary security device 300 shown in FIGS. 5-11. The exemplary axle 360 has a threaded left end 361, a threaded right end 362, and a non-threaded center section 363 between the threaded left end 361 and the threaded right end 362, wherein the threaded left end 361 and threaded right end 362 are each machined with a thread pattern (e.g., M6) that is counter rotational to the other. For example, the threaded left end 361 can be threaded with a left hand thread 363, while the threaded right end 362 can be threaded with a right hand thread 364. As shown in FIGS. 5-11, the axle 360 extends parallel to the longitudinal axis 301 of the security device 300 from the left clamp 370, through the left spacer 330, body assembly 320, and right spacer 340 to the right clamp 390, with all of the components aligned along the axle 360. While the exemplary embodiment uses a single axle 360, it will be understood that more than one axle 360 can be employed.

As shown in FIG. 16, a hexagonal key hole 366 is located at the tip of the threaded left end 361 of the axle 360. FIG. 17 is a perspective view of the exemplary hexagonal key hole 366 of the first exemplary security device 300 shown in FIGS. 5-11. As shown in FIGS. 16 and 17, a security pin 367 is located within the hexagonal key hole 366. In one embodiment, the security pin 367 comprises a cylinder with a central key hole. With this hexagonal key hole 366 and security pin 367, the axle 360, when installed, can only be rotated by inserting a suitable tool into the hexagonal key hole 366. For example, a conventional hexagonal wrench sized to be inserted into and engage the hexagonal key hole 366 and including an aperture or other structure to receive and surround the security pin 367 can be used.

Figure 18:
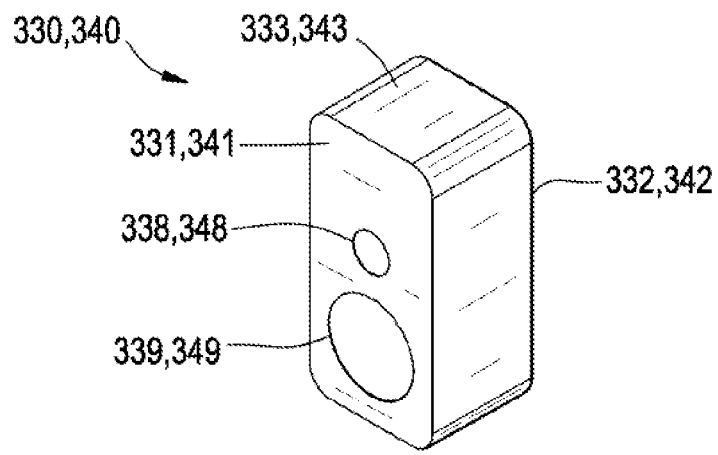
FIG. 18 is a perspective view of exemplary left and right spacers of the first exemplary security device shown in FIGS. 5-11.

FIG. 18 is a perspective view of exemplary left and right spacers 330, 340 of the first exemplary security device 300 shown in FIGS. 5-11. In one embodiment, the left spacer 330 and the right spacer 340 are identical. Each of the spacers 330, 340 include a left side 331, 341, a right side 332, 342, and a center section 333, 343 between the left side 331, 341 and right side 332, 342. A guide pin hole 338, 348 extends transversely through the spacers 330, 340, allowing the guide pin 350 (FIGS. 5-11, 15) to extend through the spacers 330, 340. Similarly, an axle hole 339, 349 extends transversely through the spacers 330, 340, allowing the axle 360 (FIGS. 5-11, 16) to extend through the spacers 330, 340.

The spacers 330, 340 serve to stabilize and maintain the alignment of the left clamp 370, body assembly 320, and right clamp 390. The spacers also can also provide the aesthetic benefit of covering the portion of the length of the guide pin 350 and the axle 360 extending from the body assembly 310 to the left clamp 370 and the right clamp 390 (FIGS. 5-11). The width of the spacers 330, 340 can be determined based on the length of the guide pin 350 and the axle 360, which can be based on the width of the handheld electronic device. For example, the narrower spacers 330, 340 shown in FIGS. 5-11 and 18 can be used in a security device 300 for a smartphone 100 (FIGS. 1-2).

Figure 19:
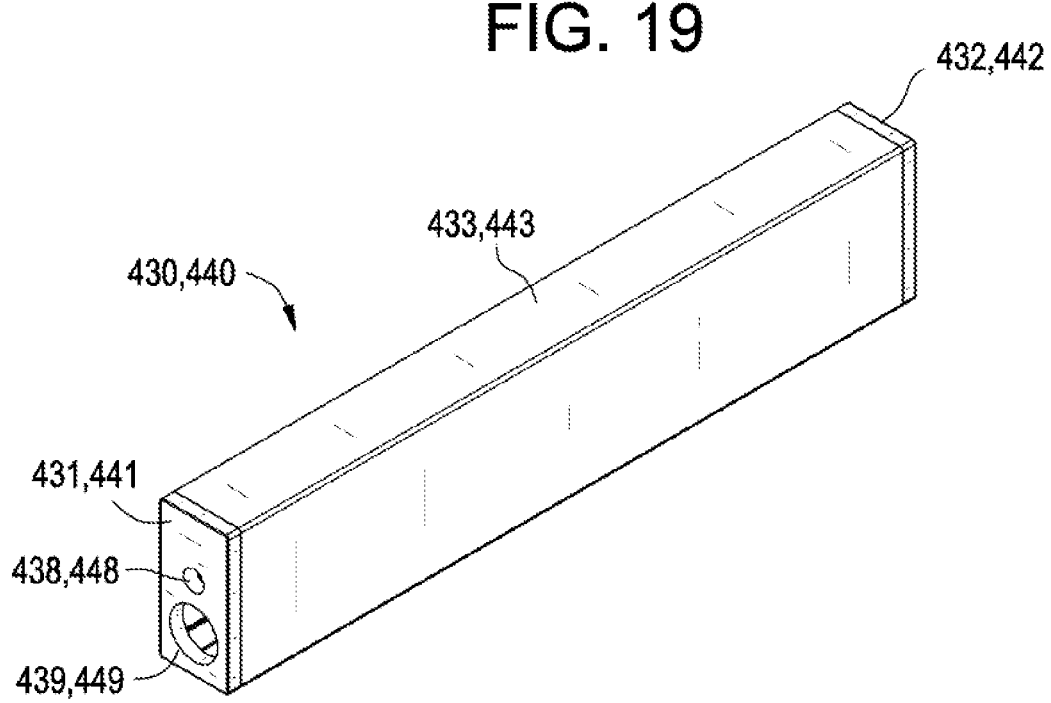
FIG. 19 is a perspective view of exemplary left and right spacers of the second exemplary security device shown in FIG. 24.

FIG. 19 is a perspective view of exemplary left and right spacers 430, 440 of the second exemplary security device 400 shown in FIG. 24. The wider spacers 430, 440 shown in FIGS. 19 and 24 can be used in a security device 400 for an electronic tablet 200 (FIGS. 3-4), which also includes a longer guide pin 450 and axle 460. As shown in FIG. 19, in one embodiment, the left spacer 430 and the right spacer 440 are identical. Each of the spacers 430, 440 include a left side 431, 441, a right side 432, 442, and a center section 433, 443 between the left side 431, 441 and the right side 432, 442. A guide pin hole 438, 448 extends transversely through the spacers 430, 440, allowing the guide pin 450 (FIG. 24) to extend through the spacers 430, 440. Similarly, an axle hole 439, 449 extends transversely through the spacers 430, 440, allowing the axle 460 (FIG. 24) to extend through the spacers 430, 440.

Figure 25:
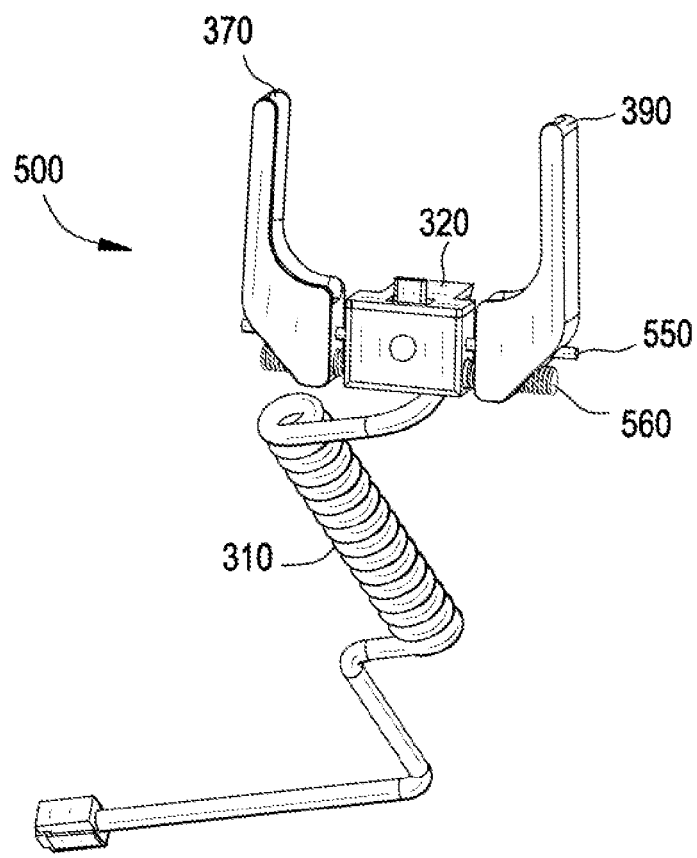
FIG. 25 is a perspective front view of a third exemplary security device for securing a handheld electronic device.

While the exemplary embodiment uses two spacers 330, 340, it will be understood that more than, or less than, two spacers can be employed. For example, FIG. 25 is a perspective front view of a third exemplary security device 500 for securing a more narrow handheld electronic device where spacers are not used, leaving additional portions of the guide pin 550 and axle 560 uncovered.

Figure 20:
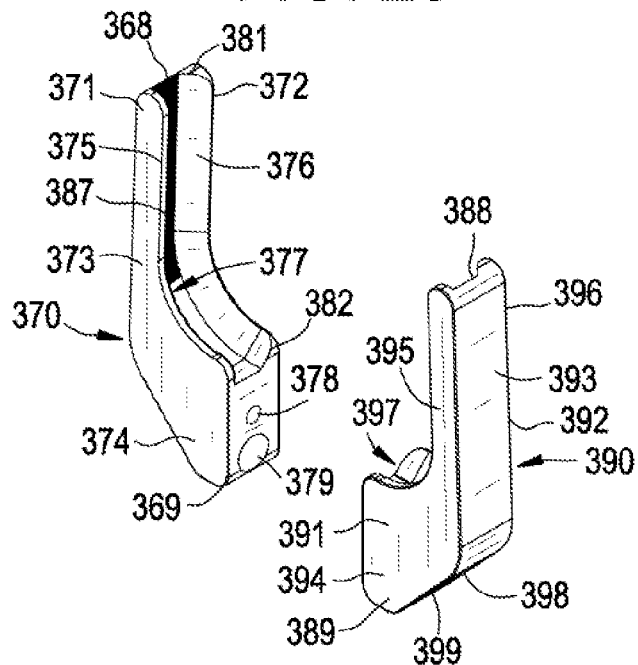
FIG. 20 is a front perspective view of an exemplary left clamp and right clamp of the exemplary security devices shown in FIGS. 5-11, 24-27, and 31.
Figure 21:
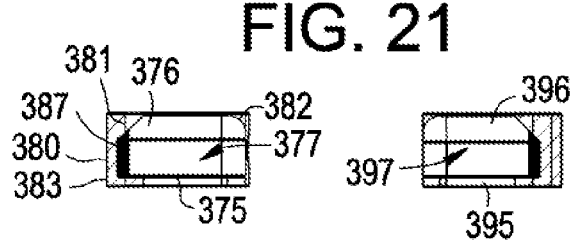
FIG. 21 is a top view of the exemplary left clamp and right clamp of the exemplary security devices shown in FIGS. 5-11, 24-27, and 31.
Figure 22:
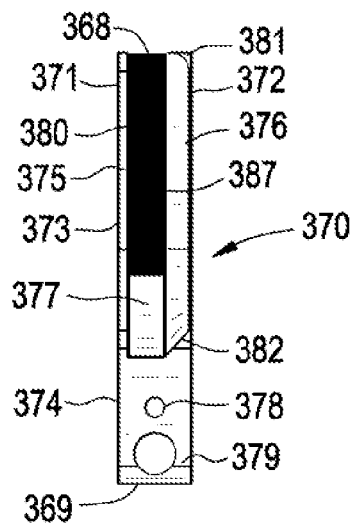
FIG. 22 is a side view of the exemplary left clamp of exemplary security devices shown in FIGS. 5-11, 24-27, and 31.

FIGS. 20-22 are perspective, top, and side views of the exemplary left clamp 370 and right clamp 390 of the first exemplary security device 300 shown in FIGS. 5-11. The left clamp 370 has a top end 368 and a bottom end 369 as well as a front side 371 and a back side 372. A left base 374 is located at the bottom end 369 of the left clamp 370, with a left retention leg 373 extending from the left base 374 to the top end 368 of the left clamp 370. A gripping channel 377 extending along the inner surface of the left retention leg 373 and the left base 374 of the left clamp 370 is formed by a side wall 380 extending between a front wall 375 on the front side 371 of the left clamp 370, and a back wall 376 on the back side 372 of the left clamp 370. A guide pin hole 378 extends transversely through the left base 374 of the left clamp 370, allowing the guide pin 350 (FIGS. 5-11, 15) to extend at least partially through the left clamp 370. Similarly, an axle hole 379 extends transversely through the left base 374 of the left clamp 370, allowing the axle 360 (FIGS. 5-11, 16) to extend at least partially through the left clamp 370.

Similarly, the right clamp 390 has a top end 388 and a bottom end 389 as well as a front side 391 and a back side 392. A right base 394 is located at the bottom end 389 of the right clamp 390, with a right retention leg 393 extending from the right base 394 to the top end 388 of the right clamp 390. A gripping channel 397 extending along the inner surface of the right retention leg 393 and the right base 394 of the right clamp 390 is formed by a side wall extending between a front wall 395 on the front side 391 of the right clamp 390 and a back wall 396 on the back side 392 of the right clamp 390. A guide pin hole 398 extends transversely through the left base 374 of the right clamp 390, allowing the guide pin 350 (FIGS. 5-11, 15) to extend at least partially through the right clamp 390. Similarly, an axle hole 399 extends transversely through the left base 374 of the right clamp 390, allowing the axle 360 (FIGS. 5-11, 16) to extend at least partially through the right clamp 390.

A handheld electronic device (e.g., the smartphone 100 (FIGS. 1-2)) can be connected to the security device 300 by directly inserting the charging/data electrical connector 326 (shown as a Micro USB electrical connector) of the body assembly 320 into the charging/data port 107 (FIGS. 1-2) of the smartphone 100. The left clamp 370 and the right clamp 390 are moved axially toward each other so that the gripping channel 377 formed on the inner surface of the left clamp 370 (FIGS. 20-22) presses against and grips the bottom-left corner 103 along the left edge 113 and the bottom edge 112 of the smartphone 100, while the gripping channel 397 formed on the inner surface of the right clamp 390 (FIG. 20) presses against and grips the bottom-right corner 104 along the right edge 114 and the bottom edge 112 of the smartphone 100.

As discussed earlier, the exemplary axle 360 (FIGS. 16-17) has a threaded left end 361, a threaded right end 362, and a non-threaded center section 363, wherein the threaded left end 361 and threaded right end 362 are each machined with a thread pattern (e.g., M6) that is counter rotational to the other. For example, the threaded left end 361 can be threaded with a left hand thread 363, while the threaded right end 362 can be threaded with a right hand thread 364. Correspondingly, the axle hole 379 in the left base 374 of the left clamp 370 is machined with a left hand thread (e.g., M6) to receive the left hand thread 363 of the threaded left end 361 of the axle 360 when threaded into the axle hole 379. The axle hole 399 in the right base 394 of the right clamp 390 is machined with a right hand thread (e.g., M6) to receive the right hand thread 364 of the threaded right end 362 of the axle 360. when threaded into the axle hole 399.

When a suitable hexagonal wrench tool sized to be inserted into and engage the hexagonal key hole 366 and including an aperture or other structure to receive and surround the security pin 367 (FIGS. 16-17) is inserted into the hexagonal key hole 366 and turned in a first direction (e.g., clockwise), the left clamp 370 moves axially toward the body assembly 320 and the right clamp 390 moves axially toward the body assembly 320. Accordingly, once a smartphone 100 (FIGS. 1-2)) or other handheld electronic device is connected to the security device 300 (FIGS. 5-11) by directly inserting the charging/data electrical connector 326 (shown as a Micro USB electrical connector) of the body assembly 320 into the charging/data port 107 (FIGS. 1-2) of the smartphone 100, the left clamp 370 and the right clamp 390 can be axially moved toward each other such that their gripping channels 377, 397 press against and grip the bottom end 102 of the smartphone 100. Conversely, with the suitable hexagonal wrench tool is inserted into the hexagonal key hole 366 and turned in a second direction (e.g., counterclockwise), the left clamp 370 moves axially away from the body assembly 320 and the right clamp 390 moves axially away the body assembly 320. As the left clamp 370 and right clamp 390 move axially, the guide pin 350 slides through the guide pin holes 378, 398 in the clamps 370, 390. In this way, the left clamp 370 and right clamp 390 can be infinitely adjusted to clamp onto and securely hold the bottom-left corner 103 and the bottom-right corner 104 of the smartphone 100.

To enhance the gripping of the left clamp 370 and the right clamp 390, the gripping channels 377, 397 can have additional features as shown in FIGS. 20-22. For example, in one embodiment, an adhesive 387 (e.g., VHB double sided tape by 3M, DUAL LOCK by 3M) can be placed inside the gripping channels 377, 397 of the clamps 370, 390 to secure the sides of the handheld electronic device to the clamps 370, 390 and resist vertical movement (or shearing) of the handheld electronic device out of the security device 300. The adhesive 387 can be placed along a portion or the entire length of the gripping channels 377, 397.

In addition, as shown in FIGS. 20-22, the gripping channels 377, 397 can be shaped to substantially match the profile of the side edges 113, 114 and the bottom edge 112 of the smartphone 100 (FIGS. 1-2). For example, the left clamp 370 can form a U-shaped channel 377, 397 with the side wall 380 extending between the front wall 375 and the back wall 376. In addition, a back wall top chamfer 381 and a back wall bottom chamfer 382 can be added between the side wall 380 and the back wall 376 to match the shape of a handheld electronic device having a profile other than a U-shape.

Figure 23:
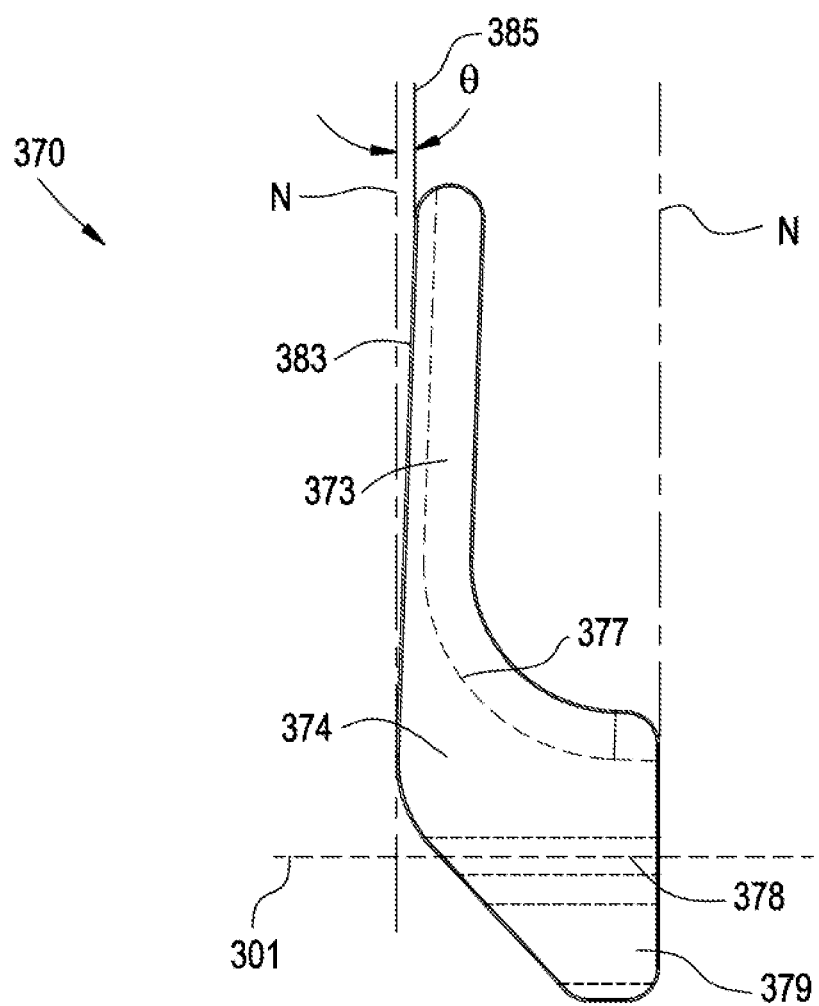
FIG. 23 is a front view of the exemplary security devices shown in FIGS. 5-11, 24-27, and 31.

FIG. 23 is a front view of the exemplary left clamp 370 of the first exemplary security device 300 shown in FIGS. 5-11. In one embodiment, in order to account for the outward bending of the left retention leg 373 of the left clamp 370 that will occur when the left clamp 370 presses against the handheld electronic device, the left retention leg 373 extends from the left base 374 at an inward angle toward the body assembly 320 so that when the left retention leg 373 completes bending outwardly, it will be orthogonal to the longitudinal axis 301 of the security device 300 in the secure position. The outer surface 383 of the side wall 381 of the left clamp 370 is shown in FIGS. 21 and 23. This outer surface 383 forms an outer surface plane 385, which forms an angle (θ) (e.g., 2 degrees) between itself and the normal to the longitudinal axis 301 of the security device 300.

FIGS. 26-30 are perspective, side, and exploded views of a fourth exemplary security device 600 for securing a handheld electronic device, such as the smartphone 100 shown in FIGS. 1 and 2 or similar device. Since this exemplary security device 600 does not include clamps, it may be suitable for a lower-theft-risk installation. In one embodiment, the security device 600 includes a cord assembly 310 for connecting a security system main terminal (not shown) to a body assembly 620.

As will be explained, a handheld electronic device (e.g., the smartphone 100 (FIGS. 1-2)) is connected to the security device 600 by directly inserting the charging/data electrical connector 626 (shown as a Micro USB electrical connector) of the body assembly 620 into the charging/data port 107 (FIGS. 1-2) of the smartphone 100. A pivot plate 640 is pivotally connected to the body assembly 620 and is pivotally connected to a backing plate 660. An adhesive 670 is attached to the front surface 669 of the backing plate 660. The adhesive 670 is attached to the back of a handheld electronic device connected to the security device 600. As best illustrated in FIG. 30, the pivot plate 640 allows the same security device 600 to be used for handheld electronic devices with varying depths and dimensions.

Figure 26:
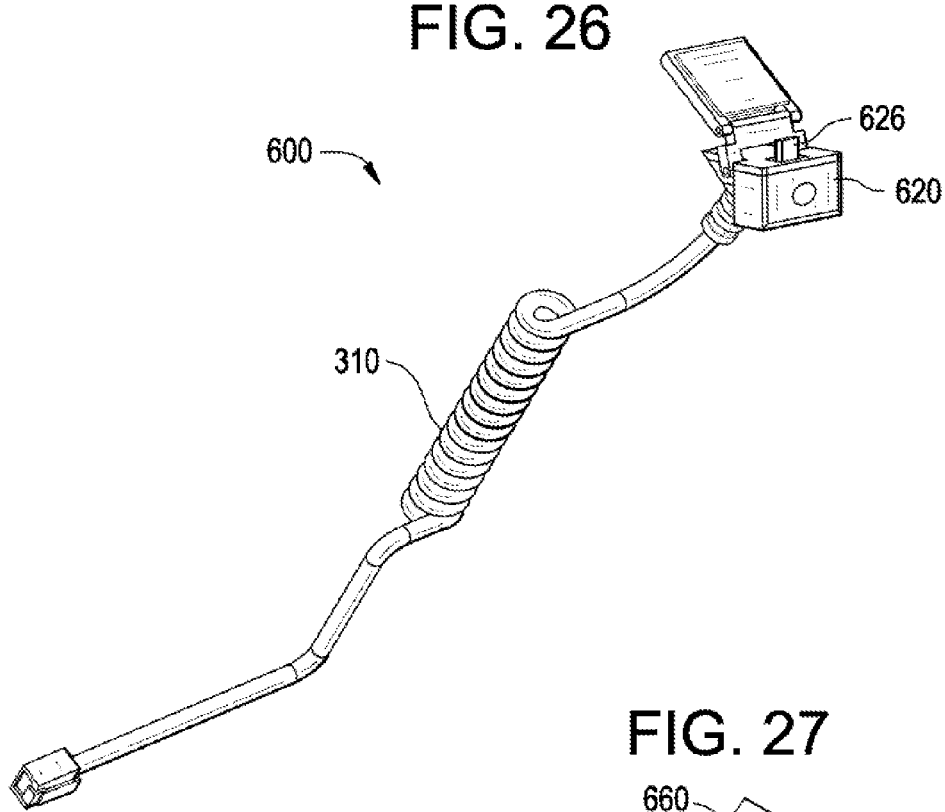
FIG. 26 is a perspective front view of a fourth exemplary security device for securing a handheld electronic device.
Figure 27:
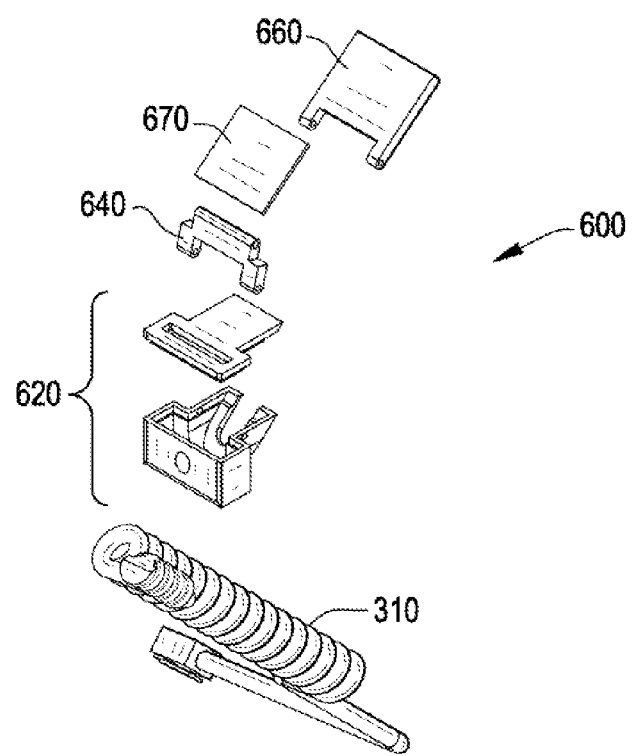
FIG. 27 is an exploded front view of the fourth exemplary security device for securing a handheld electronic device.
Figure 28:
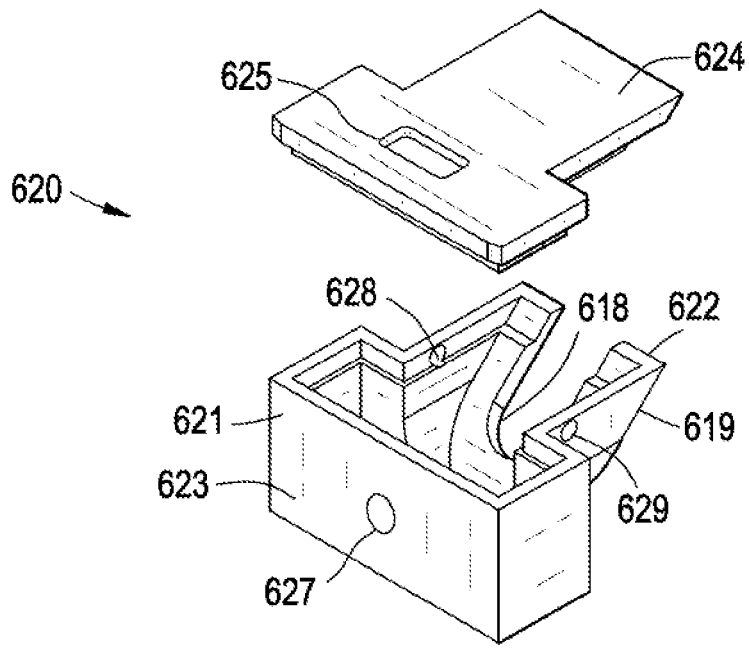
FIG. 28 is an exploded view of an exemplary body assembly of the fourth exemplary security device shown in FIGS. 26-27 for housing a Micro USB electrical connector.

FIG. 28 is an exploded view of an exemplary body assembly 620 of the fourth exemplary security device 600 shown in FIGS. 26-27 for housing a Micro USB charging/data electrical connector 626. The body assembly 620 includes a front end 621 and a back end 622. A housing 623 is located at the front end 621 of the body assembly and houses the charging/data electrical connector 626 (FIG. 26) and associated elements (e.g., circuit board, wiring, etc.). A cord assembly receptacle 619, which includes a cord assembly receptacle slot 618, can receive the cord assembly 310 (FIGS. 5-7, 15), which includes the wiring to connect the body assembly 620 to a main terminal (not shown) of the security system. A cover 624 can be electromagnetically welded to and enclose the top portion of the housing 623 and the top portion of the cord assembly receptacle 619. The cover 624 includes an opening 625 sized to permit the charging/data electrical connector 626 to extend up from the housing 623 through the cover 624. An indicator light 627 (e.g., a light emitting diode (LED)) is located on the front surface of the housing 623 to provide a status indication of the security device 600 (e.g., blue light means a secure condition and red light means an alarm condition). The wiring of the cord assembly 310 from the security system main terminal (not shown) to the body assembly 620 can be used to charge the smartphone 100 and to provide power to the LED 627. The security system main terminal (not shown) can be used to monitor whether the charging/data port 107 of the smartphone 100 remains connected to (secure condition), or is disconnected from (alarm condition), the charging/data electrical connector 626 of the body assembly 620. The cord assembly receptacle 619 of the body assembly 620 includes a left pivot hole 628 and a right pivot hole 629 for connecting to the pivot plate 640.

Figure 29:
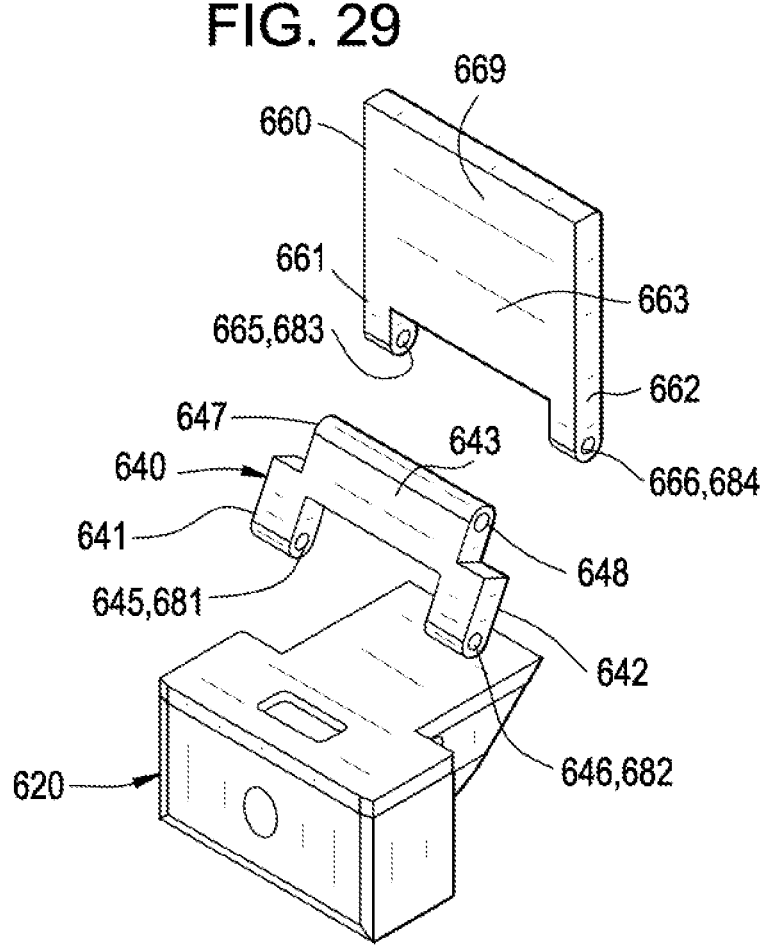
FIG. 29 is an exploded view of the exemplary body assembly, the exemplary pivot plate, and the exemplary backing plate of the fourth exemplary security device shown in FIGS. 26-27.
Figure 30:
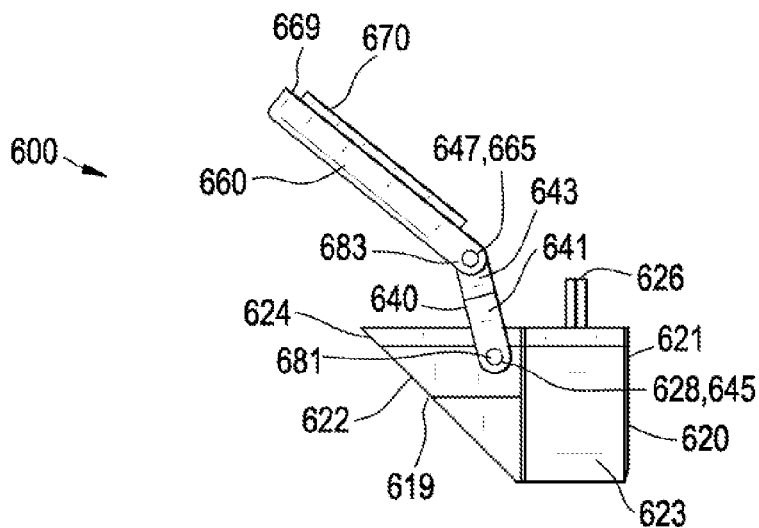
FIG. 30 is a side view of the exemplary body assembly, the exemplary pivot plate, and the exemplary backing plate of the fourth exemplary security device shown in FIGS. 26-27.

FIGS. 29-30 are exploded and side views of the exemplary body assembly 620, the exemplary pivot plate 640, and the exemplary backing plate 660 of the fourth exemplary security device 600 shown in FIGS. 26-27. The pivot plate 640 includes a left leg 641, a right leg 642, and a center section 643 between the left leg 641 and the second leg 642. The left leg 641 has a left lower pivot hole 645 and the right leg 642 has a right lower pivot hole 646. The center section 643 has a left upper pivot hole 647 and a right upper pivot hole 648.

The backing plate 660 includes a left leg 661, a right leg 662, and a center section 663 between the left leg 661 and right leg 662. The left leg 661 has a left pivot hole 665 and the right leg 662 has a right pivot hole 666. An adhesive 670 (e.g., tape, fastener) is placed on the front surface 669 of the backing plate 660 for attachment to the back side 130 of the smartphone 100 (FIGS. 1-2) or the back side 230 of the electronic tablet 200 (FIGS. 3-4).

The pivot plate 640 is pivotally attached to the body assembly 620 using a left lower pivot pin 681 extending through the left lower pivot hole 645 of the left leg 641 of the pivot plate 640 and the left pivot hole 628 the cord assembly receptacle 619 of the body assembly 620, and using a right lower pivot pin 682 extending through the right lower pivot hole 646 of the right leg 642 of the pivot plate 640 and the right pivot hole 629 of the cord assembly receptacle 619 of the body assembly 620. The pivot plate 640 is pivotally attached to the backing plate 660 using a left upper pivot pin 683 extending through the left pivot hole 665 of the left leg 661 of the backing plate 660 and the left upper pivot hole 647 of the center section 643 of the pivot plate 640, and using a right upper pivot pin 684 extending through the right pivot hole 666 of the right leg 662 of the backing plate 660 and the right upper pivot hole 648 of the center section 643 of the pivot plate 640.

As best seen in FIG. 30, the connection of the backing plate 660 to the body assembly 620 using a pivot plate 640 allows the same security device 600 to be used for handheld electronic devices with varying depths and dimensions. For example, for a thin handheld electronic device, the pivot plate 640 can be oriented nearly vertically to place the backing plate 660 and its adhesive 670 on the back side of the handheld electronic device. For a thicker handheld electronic device, the pivot plate 640 can be oriented more horizontally to place the backing plate 660 and its adhesive 670 on the back side of the handheld electronic device.

Figure 31:
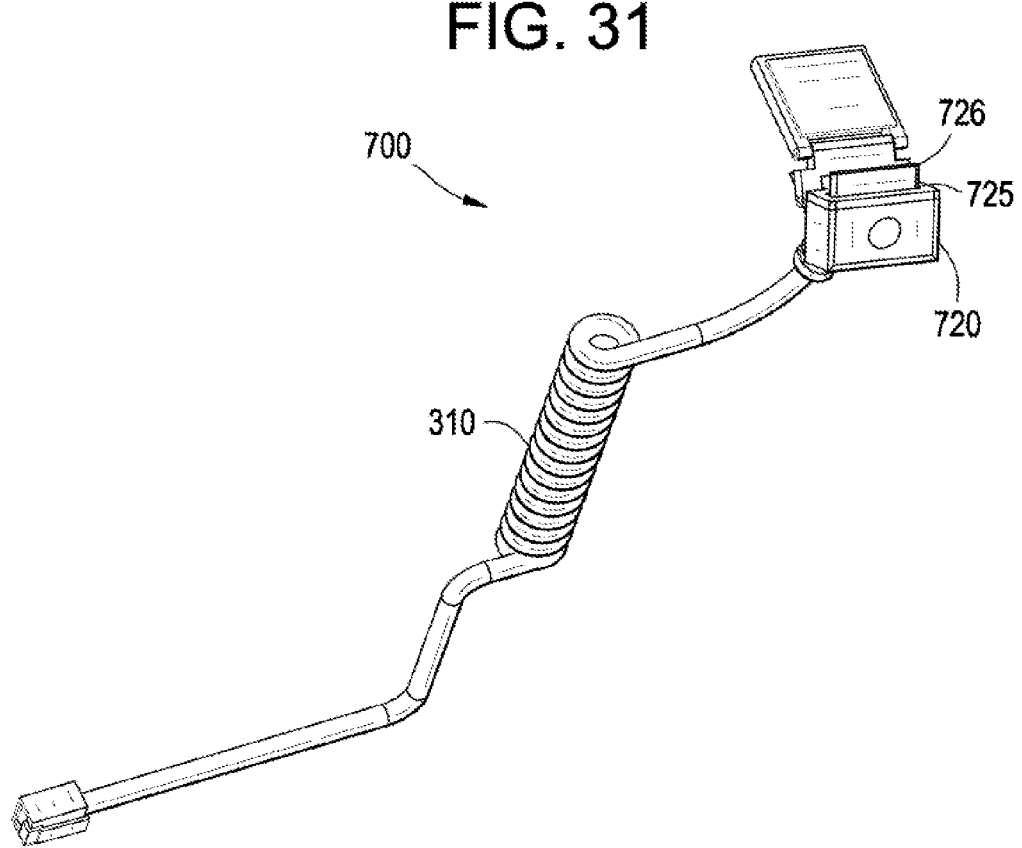
FIG. 31 is a perspective front view of a fifth exemplary security device for securing a handheld electronic device.

FIG. 31 is a perspective front view of a fifth exemplary security device 700 for securing a handheld electronic device requiring a 30-pin charging/data electrical connector 726. The cover of the body assembly 720 includes an opening 725 sized to permit the charging/data electrical connector 726 to extend up through the cover of the body assembly 720. The security device 700 shown in FIG. 31 is essentially the same as the security device 600 shown in FIGS. 26-30 except that the security device 700 of FIG. 31 uses a 30-pin charging/data electrical connector 726 and the security device 600 of FIGS. 26-30 uses a Micro USB charging/data electrical connector 626.

Figure 32:
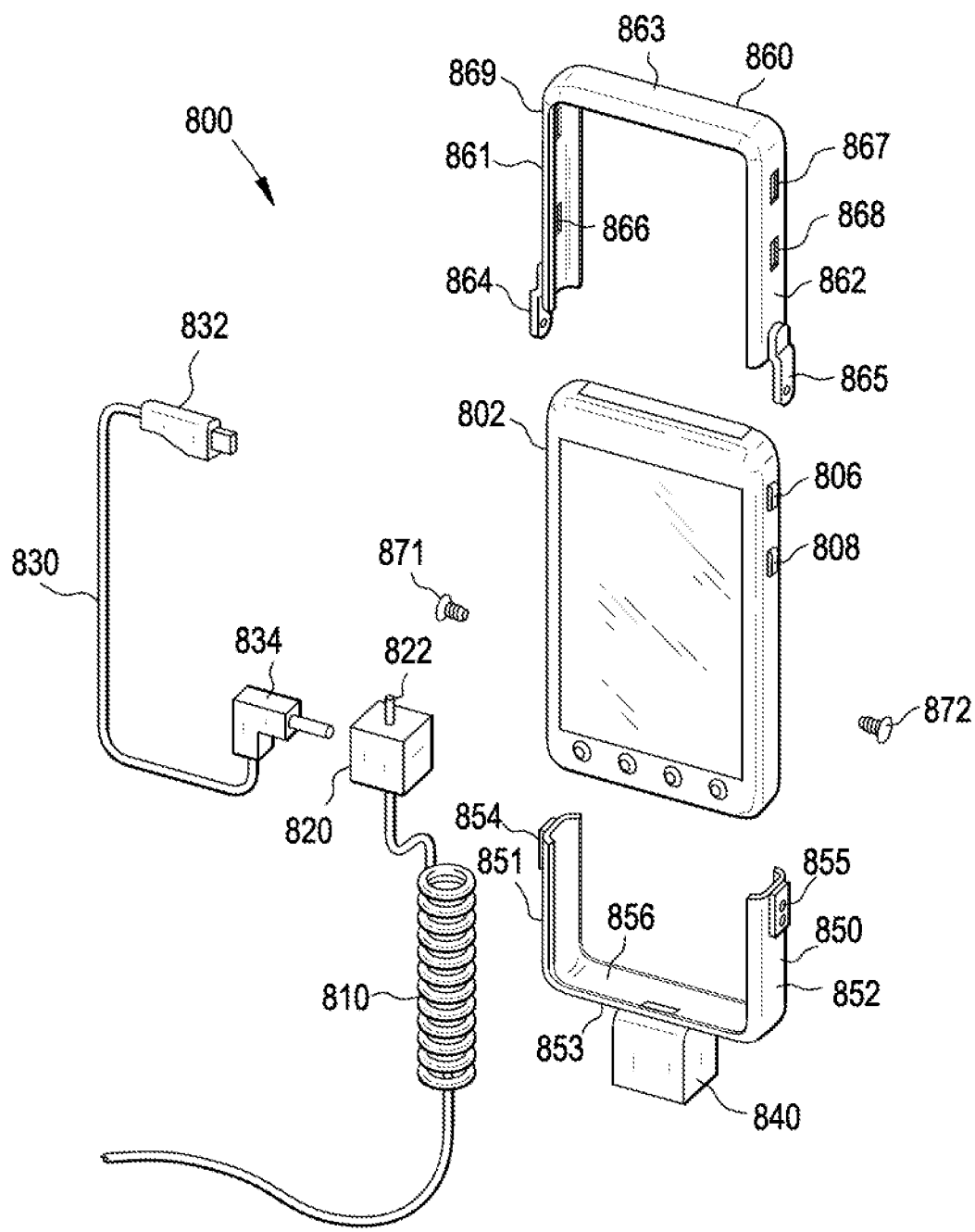
FIG. 32 is an exploded perspective view of a sixth exemplary security device for securing a handheld electronic device.

FIGS. 32-34 are exploded and perspective rear and front views of a sixth exemplary security device 800 for securing a smartphone 802 or other handheld electronic device. The exemplary smartphone 802 shown in FIGS. 32-34 includes a power control 804, a first volume control 806, and a second volume control 808 located on the side edges of the smartphone 802. Rather than have a charging/data port on the bottom edge of the smartphone 802, the smartphone 802 has a charging/data port on the side edge, requiring a charging/data cable 830 between a power box 820 and the charging/data port of the smartphone 802. In one embodiment, the charging/data cable 830 includes a Micro USB charging/data electrical connector 832 for connecting to the smartphone 802 and an audio jack connector 834 for connecting to the power box 820. The security device 800 includes a cord assembly 810 for connecting a security system main terminal (not shown) to the power box 820. In one embodiment, the power box 820 is inserted into the body 840 of the security device 800 and a plunger-type power box alarm switch 822 is set once the power box 820 is inserted.

The security device 800 includes a U-shaped lower clamp 850. The lower clamp 850 has a left retention leg 851, a right retention leg 852, and a base 853 between the left retention leg 851 and the right retention leg 852. The top of the left retention leg 851 of the lower frame 850 has a left clamp interface 854 for interfacing with a U-shaped upper clamp 860, while the top of the right retention leg 852 of the lower clamp 850 has a right clamp interface 855 for interfacing with the upper clamp 860. A gripping channel 856 is formed on the inner surface of the lower clamp 850 to press against and grip the side edges and the bottom edge of the smartphone 802.

The upper clamp 860 has a left retention leg 861, a right retention leg 862, and a base 863 between the left retention leg 861 and the right retention leg 862. The bottom of the left retention leg 861 of the upper frame 860 has a left clamp interface 864 for interfacing with the lower clamp 850, while the bottom of the right retention leg 862 of the upper clamp 860 has a right clamp interface 865 for interfacing with the lower clamp 850. A gripping channel 866 is formed on the inner surface of the upper clamp 860 to press against and grip the side edges and the top edge of the smartphone 802. The upper clamp 860 can include a first volume control opening 867, a second volume control opening 868, and a power control opening 869 to access controls located on the side edges of the smartphone 802.

A first fastener 871 can extend through the left clamp interface 864 of the upper clamp 860 and the left clamp interface 854 of the lower clamp 850, and a second fastener 872 can extend through the right frame interface 865 of the upper clamp 860 and the right clamp interface 855 of the lower clamp 850 to fasten the upper clamp 860 to the lower clamp 850 and to secure the smartphone 802. The gripping channels 856, 866 can be shaped to substantially match the profile of the edges of the smartphone 802. In addition, an adhesive can be inserted into the gripping channels 856, 866 for additional retention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A security device for functional display of a handheld electronic device, wherein the handheld electronic device has a first edge, a second edge, and a third edge extending between the first edge and the second edge, and wherein the handheld electronic device has first corner between the first edge and the third edge and a second corner between the second edge and the third edge, the security device comprising:

an axle having a first end, a second end, and a center section extending between the first end of the axle the second end of the axle, wherein the first end of the axle is threaded with a first thread pattern and the second end of the axle is threaded with a second thread pattern, and wherein the first thread pattern is counter rotational to the second thread pattern;

a body assembly configured for contacting the third edge of the handheld electronic device, the body assembly having a first hole extending transversely through the body assembly, wherein the center section of the axle extends through the first hole of the body assembly parallel to a longitudinal axis of the security device;

a first clamp having a first base and a first retention leg extending from the first base, the first clamp having a first hole extending transversely through the first base of the first clamp parallel to the longitudinal axis of the security device, wherein the first hole of the first base of the first clamp is threaded with the first thread pattern, wherein the first end of the axle is threaded into the first hole of the first base of the first clamp, and wherein the first clamp further comprises a first channel formed on the inner surface of the first retention leg and the first base configured to grip the first corner along the first edge and the third edge of the handheld electronic device; and a second clamp having a second base and a second retention leg extending from the second base, the second clamp having a first hole extending transversely through the second base of the second clamp parallel to the longitudinal axis of the security device, wherein the first hole of the second base of the second clamp is threaded with the second thread pattern, and wherein the second end of the axle threaded into the second hole of the second base of the second clamp, wherein the second clamp further comprises a second channel formed on the inner surface of the second retention leg and the second base configured to grip the second corner along the second edge and the third edge of the handheld electronic device;

wherein the axle is configured to move the first clamp axially toward the body assembly and the second clamp axially toward the body assembly to secure the handheld electronic device when the axle is rotated in a first direction.

2. The security device of claim 1, wherein the body assembly further comprises an electrical connector extending from the body assembly configured to be directly inserted into a port on the third edge of the handheld electronic device.

3. The security device of claim 1, further comprising:
a first spacer located between the first clamp and the body assembly, the first spacer having a first hole extending transversely through the first spacer, wherein the axle extends through the first hole of the first spacer parallel to the longitudinal axis of the security device.

4. The security device of claim 3, further comprising:
a second spacer located between the second clamp and the body assembly, the second spacer having a first hole extending transversely through the second spacer, wherein the axle extends through the first hole of the second spacer parallel to the longitudinal axis of the security device.

5. The security device of claim 1, further comprising:
a second hole extending transversely through the body assembly parallel to the longitudinal axis of the security device;
a second hole extending transversely through the first base of the first clamp parallel to the longitudinal axis of the security device,
a second hole extending transversely through the second base of the second clamp parallel to the longitudinal axis of the security device, and
a guide pin extending through the second holes of the body assembly, the first base of the first clamp and the second base of the second clamp,
wherein the guide pin is configured to slide through the second holes of the first base of the first clamp and the second base of the second clamp as the first clamp and the second claim move axially.

6. The security device of claim 4, further comprising:
a second hole extending transversely through the body assembly parallel to the longitudinal axis of the security device;
a second hole extending transversely through the first base of the first clamp parallel to the longitudinal axis of the security device,
a second hole extending transversely through the second base of the second clamp parallel to the longitudinal axis of the security device, and
a second hole extending transversely through the first spacer parallel to the longitudinal axis of the security device;
a second hole extending transversely through the second spacer parallel to the longitudinal axis of the security device;
a guide pin extending through the second holes of the body assembly, the first spacer, the second spacer, the first base of the first clamp, and the second base of the second clamp,
wherein the guide pin is configured to slide through the second holes of the first spacer, the second spacer, the first base of the first clamp, and the second base of the second clamp as the first clamp and the second clamp move axially.

7. The security device of claim 1, further comprising a first adhesive located in the first channel of the first clamp.

8. The security device of claim 7, wherein the first adhesive is double-sided tape.

9. The security device of claim 7, wherein the first adhesive is an adhesive fastener.

10. The security device of claim 1, wherein the first retention leg extends from the first base at an inward angle toward the body assembly.

11. The security device of claim 1, wherein the first channel comprises a first wall extending between a second wall and a third wall, and further comprises a first chamfer between the first wall and the second wall to configure the first channel to match the shape of the first corner of the handheld electronic device.

12. A security device for functional display of a handheld electronic device, wherein the handheld electronic device has a first edge, a second edge, and a third edge extending between the first edge and the second edge, and wherein the handheld electronic device has first corner between the first edge and the third edge and a second corner between the second edge and the third edge, the security device comprising:
an axle having a first end, a second end, and a center section extending between the first end of the axle the second end of the axle, wherein the first end of the axle is threaded with a first thread pattern and the second end of the axle is threaded with a second thread pattern, and wherein the first thread pattern is counter rotational to the second thread pattern;
a body assembly configured for contacting the third edge of the handheld electronic device, the body assembly having a first hole extending transversely through the body assembly, wherein the center section of the axle extends through the first hole of the body assembly parallel to a longitudinal axis of the security device, the body assembly further comprising an electrical connector extending from the body assembly configured to be directly inserted into a port on the third edge of the handheld electronic device;
a first clamp having a first base and a first retention leg extending from the first base, the first clamp having a first hole extending transversely through the first base of the first clamp parallel to the longitudinal axis of the security device, wherein the first hole of the first base of the first clamp is threaded with the first thread pattern, wherein the first end of the axle is threaded into the first hole of the first base of the first clamp, and wherein the first clamp further comprises a first channel formed on the inner surface of the first retention leg and the first base configured to grip the first corner along the first edge and the third edge of the handheld electronic device;
a first spacer located between the first clamp and the body assembly, the first spacer having a first hole extending transversely through the first spacer, wherein the axle extends through the first hole of the first spacer parallel to the longitudinal axis of the security device;
a second clamp having a second base and a second retention leg extending from the second base, the second clamp having a first hole extending transversely through the second base of the second clamp parallel to the longitudinal axis of the security device, wherein the first hole of the second base of the second clamp is threaded with the second thread pattern, and wherein the second end of the axle threaded into the second hole of the second base of the second clamp, wherein the second clamp further comprises a second channel formed on the inner surface of the second retention leg and the second base configured to grip the second corner along the second edge and the third edge of the handheld electronic device; and
a second spacer located between the second clamp and the body assembly, the second spacer having a first hole extending transversely through the second spacer, wherein the axle extends through the first hole of the second spacer parallel to the longitudinal axis of the security device,
wherein the axle is configured to move the first clamp axially toward the body assembly and the second clamp axially toward the body assembly to secure the handheld electronic device when the axle is rotated in a first direction.

13. The security device of claim 12, further comprising:
a second hole extending transversely through the body assembly parallel to the longitudinal axis of the security device;
a second hole extending transversely through the first base of the first clamp parallel to the longitudinal axis of the security device, a second hole extending transversely through the second base of the second clamp parallel to the longitudinal axis of the security device, and a second hole extending transversely through the first spacer parallel to the longitudinal axis of the security device;

a second hole extending transversely through the second spacer parallel to the longitudinal axis of the security device;

a guide pin extending through the second holes of the body assembly, the first spacer, the second spacer, the first base of the first clamp, and the second base of the second clamp, wherein the guide pin is configured to slide through the second holes of the first spacer, the second spacer, the first base of the first clamp, and the second base of the second clamp as the first clamp and the second clamp move axially.

14. The security device of claim 12, further comprising a first adhesive located in the first channel of the first clamp.

15. The security device of claim 12, wherein the first channel comprises a first wall extending between a second wall and a third wall, and further comprises a first chamfer between the first wall and the second wall to configure the first channel to match the shape of the first corner of the handheld electronic device.

* * * * *